United States Patent
Jeong et al.

(10) Patent No.: US 12,547,277 B2
(45) Date of Patent: Feb. 10, 2026

(54) ELECTRONIC DEVICE

(71) Applicant: SAMSUNG DISPLAY CO., LTD., Yongin-si (KR)

(72) Inventors: Joo-Hyeon Jeong, Yongin-si (KR); Il Ho Lee, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 18/648,108

(22) Filed: Apr. 26, 2024

(65) Prior Publication Data

US 2025/0021191 A1  Jan. 16, 2025

(30) Foreign Application Priority Data

Jul. 10, 2023 (KR) ........................ 10-2023-0089378

(51) Int. Cl.
*G06F 3/041* (2006.01)
*G06F 3/044* (2006.01)

(52) U.S. Cl.
CPC ........ *G06F 3/04184* (2019.05); *G06F 3/0412* (2013.01); *G06F 3/0446* (2019.05)

(58) Field of Classification Search
CPC ... G06F 3/04184; G06F 3/0446; G06F 3/0417
See application file for complete search history.

(56) References Cited

U.S. PATENT DOCUMENTS

| | | | |
|---|---|---|---|
| 11,537,252 B2 | 12/2022 | Lee et al. | |
| 11,579,716 B2 | 2/2023 | So et al. | |
| 2020/0183521 A1* | 6/2020 | Mayumi | G06F 3/0412 |
| 2023/0094019 A1 | 3/2023 | Lee | |
| 2023/0176689 A1* | 6/2023 | Lee | G06F 3/04184 345/173 |
| 2023/0376147 A1* | 11/2023 | Weng | G06F 3/04182 |

FOREIGN PATENT DOCUMENTS

| | | |
|---|---|---|
| KR | 10-2350727 | 1/2022 |
| KR | 10-2022-0023878 | 3/2022 |
| KR | 10-2022-0097637 | 7/2022 |
| KR | 10-2484503 | 1/2023 |
| KR | 10-2023-0045735 | 4/2023 |

* cited by examiner

*Primary Examiner* — Peter D Mcloone
(74) *Attorney, Agent, or Firm* — F. Chau & Associates, LLC

(57) ABSTRACT

Provided is an electronic device including a display layer configured to operate in units of a display frame including a blank section and a data input section, a driving unit configured to output a sync signal and sense a noise value, a sensor layer configured to operate in a first sensing frame and a second sensing frame and including a plurality of sensing electrodes, and a touch driving unit configured to operate in a first mode when the noise value is less than a predetermined noise level and operate in a second mode when the noise value is greater than or equal to the predetermined noise level, wherein the touch driving unit may apply more touch driving signals to the plurality of sensing electrodes in the first mode than in the second mode.

20 Claims, 10 Drawing Sheets

ELECTRONIC DEVICE

CROSS-REFERENCE TO RELATED APPLICATIONS

This U.S. non-provisional patent application claims priority under 35 U.S.C. § 119 to Korean Patent Application No. 10-2023-0089378, filed on Jul. 10, 2023, the entire contents of which are hereby incorporated by reference.

BACKGROUND

The present disclosure herein relates to an electronic device that drives sensing electrodes in different modes according to noise values.

In general, flat panel display devices may be organic light-emitting display devices, liquid crystal display devices, plasma display panels, and the like.

Display devices may include a display layer configured to display an image, a display driving unit configured to transmit a signal to the display layer, a sensor layer positioned on the display layer, and a touch driving unit configured to transmit a touch driving signal to the sensor layer.

A sensor is a type of information input device and may be provided to and used for a display device. For example, the sensor may be attached to one surface of a display panel or manufactured integrally with the display panel. A user may input information by pressing or touching the sensor, while viewing an image displayed on the screen of the display device.

SUMMARY

The present disclosure provides an electronic device with improved reliability, which has a touch driving unit configured to operate in a first mode or in a second mode, based on a noise of an input image.

An embodiment of the inventive concept provides an electronic device including: a display layer configured to operate in units of a display frame including a blank section and a data input section; a driving unit configured to drive the display layer, output a sync signal which is activated in the blank section, and sense a noise value, based on an input image to be provided to the display frame; a sensor layer including a plurality of sensing electrodes and configured to operate in a first sensing frame overlapping the data input section and in a second sensing frame overlapping the blank section; and a touch driving unit configured to operate in a first mode in response to the noise value being less than a predetermined noise level and configured to operate in a second mode different from the first mode in response to the noise value being greater than or equal to the predetermined noise level, wherein the touch driving unit may apply more touch driving signals to the plurality of sensing electrodes in the first mode than in the second mode.

In an embodiment, in the first mode, the touch driving unit may operate in a first driving mode in the first sensing frame and operate in a second driving mode different from the first driving mode in the second sensing frame.

In an embodiment, operating in the first driving mode, the touch driving unit may be configured to sequentially apply the touch driving signals to the plurality of sensing electrodes, respectively.

In an embodiment, in the second driving mode, the touch driving unit may be configured to simultaneously apply the touch driving signals to the plurality of sensing electrodes, respectively.

In an embodiment, in the second mode, the touch driving unit may operate in the second driving mode in the second sensing frame.

In an embodiment, in the second mode, the touch driving unit may not provide the touch driving signals to the plurality of sensing electrodes in the first sensing frame.

In an embodiment, the plurality of sensing electrodes may include a plurality of first electrodes and a plurality of second electrodes, wherein each of the plurality of first electrodes may extend in a first direction and be arranged in a second direction crossing the first direction, and each of the plurality of second electrodes may extend in the second direction and be arranged in the first direction.

In an embodiment, a display refresh rate of the display layer may have a first frequency and a touch report rate of the sensor layer may have a second frequency, wherein the first frequency in the first mode may be lower than the second frequency and the first frequency in the second mode may be the same as the second frequency.

In an embodiment, the touch driving unit may be configured to receive the sync signal from the driving unit, and in response to the sync signal being activated, the touch driving unit may simultaneously apply the touch driving signals to the plurality of sensing electrodes.

In an embodiment, a width of the blank section may be smaller than a width of the data input section.

In an embodiment, a width of the second sensing frame may be smaller than a width of the first sensing frame.

In an embodiment of the inventive concept, an electronic device includes: a display layer configured to operate in units of a display frame comprising a blank section and a data input section; a driving unit configured to drive the display layer, output a sync signal which is activated in the blank section, and sense a noise value, based on an input image to be provided to the display frame, wherein the driving unit comprises a data driving unit and a gate driving unit, wherein: the data driving unit is configured to supply a data voltage converted based on the input image to data lines of the display layer during the data input section; and the gate driving unit supplies a gate pulse synchronized with the data voltage to gate lines of the display layer during the data input section; a sensor layer comprising a plurality of sensing electrodes and configured to operate in a first sensing frame overlapping the data input section and in a second sensing frame overlapping the blank section; and a touch driving unit configured to operate in a first mode in response to the noise value beings less than a predetermined noise level and configured to operate in a second mode different from the first mode in response to the noise value being greater than or equal to the predetermined noise level, wherein the touch driving unit applies more touch driving signals to the plurality of sensing electrodes in the first mode than in the second mode.

In an embodiment, the blank section may be a section in which the data voltage is not provided to the display layer.

In an embodiment, the sensor layer may further be configured to operate in a third sensing frame overlapping the data input section, and the touch driving unit may be configured to operate in the first driving mode in the third sensing frame in the first mode.

In an embodiment of the inventive concept, an electronic device includes: a display layer configured to operate in units of a display frame including a blank section and a data input section; a driving unit configured to drive the display layer and sense a noise value, based on an input image to be provided to the display frame; and a sensor layer including a plurality of sensing electrodes and configured to operate in units of a sensing frame including a first sensing frame overlapping the data input section and a second sensing frame overlapping the blank section, wherein the plurality of sensing electrodes may operate in a first mode or in a second mode different from the first mode, based on the noise value, wherein, in the first mode, each of the plurality of sensing electrodes may sequentially receive a touch driving signal in the first sensing frame and simultaneously receive the touch driving signal in the second sensing frame and, in the second mode, the plurality of sensing electrodes may simultaneously receive the touch driving signals only in the second sensing frame.

In an embodiment, in the second mode, the plurality of sensing electrodes may not receive the touch driving signals in the first sensing frame.

In an embodiment, the driving unit may be configured to output a sync signal which is activated in the blank section, and in response to the sync signal being activated, the plurality of sensing electrodes may simultaneously receive the touch driving signals.

In an embodiment, a display refresh rate of the display layer may have a first frequency and a touch report rate of the sensor layer may have a second frequency, wherein the first frequency in the first mode may be lower than the second frequency and the first frequency in the second mode may be the same as the second frequency.

In an embodiment, a width of the blank section may be smaller than a width of the data input section.

In an embodiment, a width of the second sensing frame may be smaller than a width of the first sensing frame.

BRIEF DESCRIPTION OF THE DRAWINGS

The accompanying drawings are included to provide a further understanding of the inventive concept, and are incorporated in and constitute a part of this specification. The drawings illustrate embodiments of the inventive concept and, together with the description, serve to explain principles of the inventive concept.

In the drawings.

DETAILED DESCRIPTION

Figure 1:
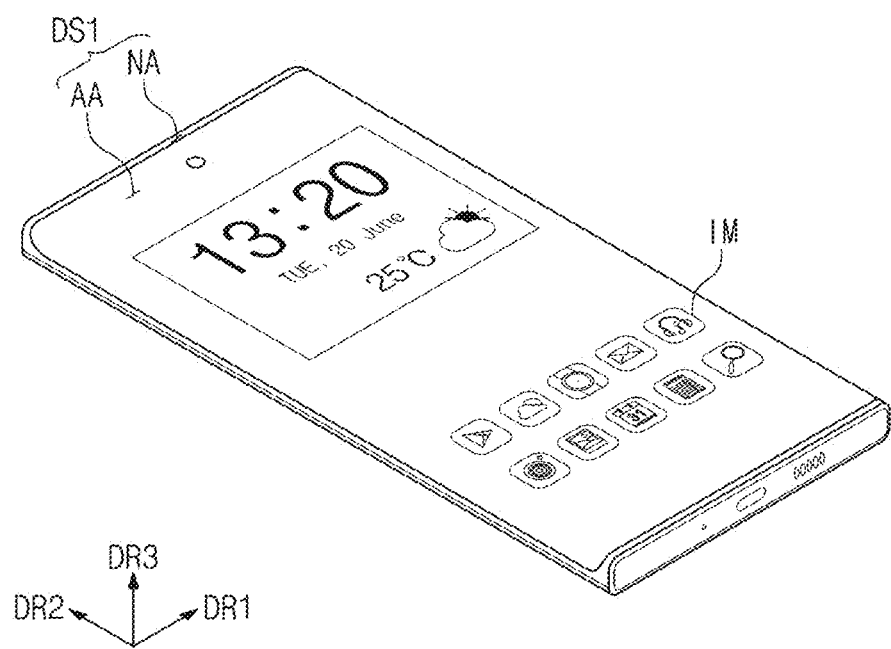
FIG. 1 is a perspective view of an electronic device according to an embodiment of the inventive concept.

In this specification, it will be understood that when an element (or region, layer, portion, etc.) is referred to as being "on", "connected to" or "coupled to" another element, it can be directly on, connected or coupled to the other element, or intervening elements may be present.

Like reference numerals refer to like elements throughout. In addition, in the drawings, the thicknesses, ratios, and dimensions of elements are exaggerated for effective description of the technical contents. As used herein, the term "and/or" includes any and all combinations that the associated configurations can define.

It will be understood that, although the terms first, second, etc. may be used herein to describe various elements, these elements should not be limited by these terms. These terms are used to distinguish one element from another element. For example, a first element could be termed a second element without departing from the scope of the present invention. Similarly, the second element may also be referred to as the first element. The terms of a singular form include plural forms unless otherwise specified.

In addition, terms, such as "below", "lower", "above", "upper" and the like, are used herein for ease of description to describe one element's relation to another element(s) as illustrated in the figures. The above terms are relative concepts and are described based on the directions indicated in the drawings.

It will be understood that the terms "include" and/or "have", when used in this specification, specify the presence of stated features, integers, steps, operations, elements, components and/or combinations thereof, but do not preclude the presence or addition of one or more other features, integers, steps, operations, elements, components, and/or combinations thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, embodiments of the inventive concept will be described with reference to the accompanying drawings.

FIG. 1 is a perspective view of an electronic device according to an embodiment of the inventive concept.

Referring to FIG. 1, the electronic device 1000 may have a shape extending in a first direction DR1 and a second direction DR2 crossing the first direction DR1. A third direction DR3 indicates a normal direction of the electronic device 1000, e.g., the thickness direction of the electronic device 1000. In this specification, the expression "when viewed on a plane or on a plane or an area on a plane" may mean a case of being viewed in the third direction DR3. A front surface (or upper surface) and a rear surface (or lower surface) of each of layers or units to be described below are defined by the third direction DR3. However, directions indicated by the first to third directions DR1, DR2, and DR3 are relative concepts and may be converted into other directions, for example, opposite directions.

The upper surface of the electronic device 1000 may be defined as a display surface DS1. The upper surface of the electronic device 1000 may have a plane defined by the first direction DR1 and the second direction DR2. An image IM generated by the electronic device 1000 may be provided to a user through the display surface DS1. As an example of the image IM, a clock display window and application icons are illustrated in FIG. 1.

In various embodiments, the display surface DS1 may include an active region AA and a peripheral region NA adjacent to the active region AA. The active region AA may be operated by an electrical signal. The peripheral region NA may surround the active region AA and define an edge of the electronic device 1000, which may be printed in a predetermined color. However, the peripheral region NA may be adjacent to only a portion of the active region AA or may be omitted in various embodiments.

In various embodiments, the electronic device 1000 may include large electronic devices, such as a television, a monitor, or an external billboard. In addition, the electronic device 1000 may include small and medium-sized electronic devices, such as a personal computer, a notebook computer, a personal digital terminal, a car navigation system, a game console, a smart phone, a tablet, or a camera. However, this is exemplary and may include other electronic devices which do not depart from the concept of the present invention.

In various embodiments, the electronic device 1000 may be a flexible electronic device, where for example, the electronic device 1000 may be a foldable electronic device.

Figure 2:
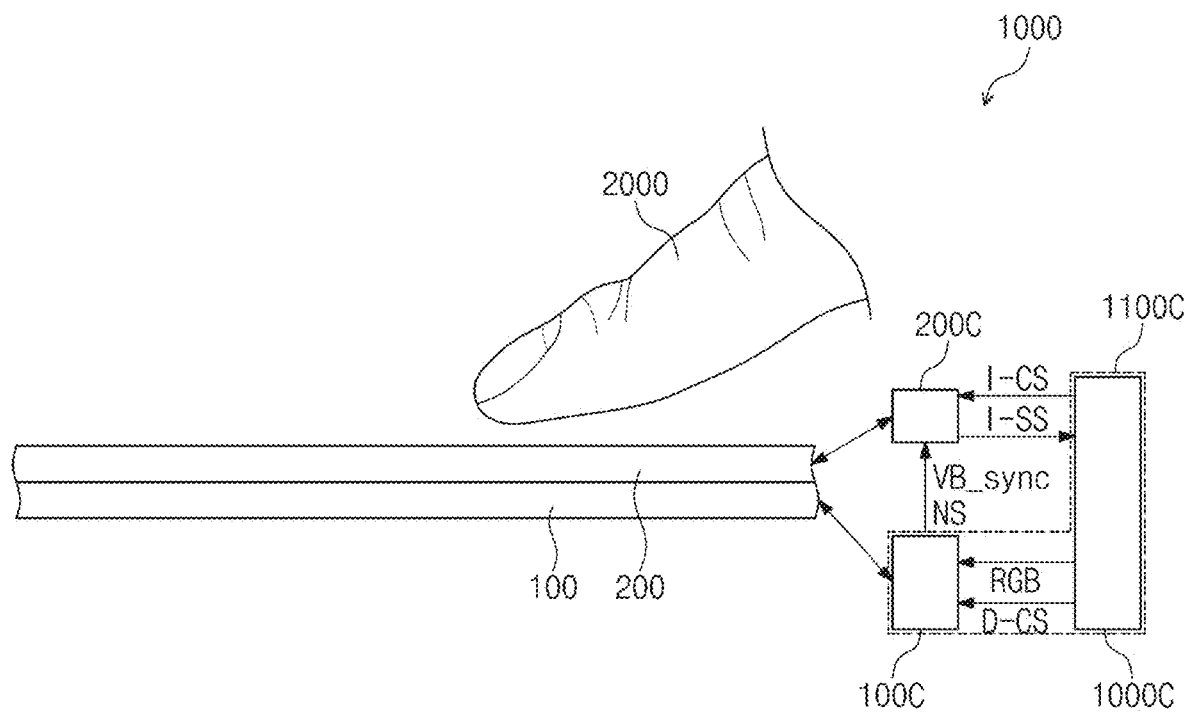
FIG. 2 is a schematic block diagram of the electronic device according to an embodiment of the inventive concept.

FIG. 2 is a schematic block diagram of the electronic device according to an embodiment of the inventive concept.

Referring to FIG. 2, the electronic device 1000 may include a display layer 100, a sensor layer 200, a touch driving unit 200C, and a driving unit 1100C.

In various embodiments, the display layer 100 may be a component that substantially generates images including an image IM (see FIG. 1). The display layer 100 may be a light-emitting display layer, where for example, the display layer 100 may be an organic light-emitting display layer, a quantum dot display layer, a micro LED display layer, or a nano LED display layer.

In various embodiments, the sensor layer 200 may be disposed on the display layer 100. The sensor layer 200 may sense an external input 2000 applied from outside the electronic device 1000, where for example, the sensor layer 200 may sense the external input 2000 applied by a user's body.

In various embodiments, the driving unit 1100C may include a display driving unit 100C and a controller 1000C. The driving unit 1100C may transmit a sync signal VB_sync to the touch driving unit 200C. For example, the display driving unit 100C may transmit the sync signal VB_sync to the touch driving unit 200C, or the controller 1000C may transmit the sync signal VB_sync to the touch driving unit 200C.

In various embodiments, the sync signal VB_sync may distinguish a section in which a data voltage Vdata (see FIG. 4) converted based on an input image RGB is input to the display layer 100 from a section in which the data voltage Vdata (see FIG. 4) is not provided thereto.

In various embodiments, the driving unit 1100C may sense a noise determined to be generated in the display layer 100, based on the input image RGB, and transmit the noise value NS to the touch driving unit 200C. For example, the display driving unit 100C may transmit the noise value NS to the touch driving unit 200C, or the controller 1000C may transmit the noise value NS to the touch driving unit 200C.

In various embodiments, the controller 1000C may control the overall operation of the electronic device 1000 or sense a change in the electronic device 1000, where for example, the controller 1000C may control the operation of the display driving unit 100C and the touch driving unit 200C. The controller 1000C may include at least one microprocessor, and the controller 1000C may be referred to as a host.

In various embodiments, the display driving unit 100C may control the display layer 100. The controller 1000C may further include a graphic controller. The display driving unit 100C may receive an input image RGB and a control signal D-CS from the controller 1000C.

In various embodiments, the control signal D-CS may include various signals, where for example, the control signal D-CS may include an input vertical synchronization signal, an input horizontal synchronization signal, a main clock signal, a data enable signal, and the like.

In various embodiments, the touch driving unit 200C may control the sensor layer 200. The touch driving unit 200C may receive a control signal I-CS from the controller 1000C, where the control signal I-CS may include a clock signal. The touch driving unit 200C may calculate the coordinate information of an external input based on a signal received from the sensor layer 200, and provide a coordinate signal I-SS, including the coordinate information, to the controller 1000C. Based on the coordinate signal I-SS, the controller 1000C may execute an operation corresponding to a user's input. For example, based on the coordinate signal I-SS, the controller 1000C may operate the display driving unit 100C, so that a new application image is displayed on the display layer 100.

Figure 3:
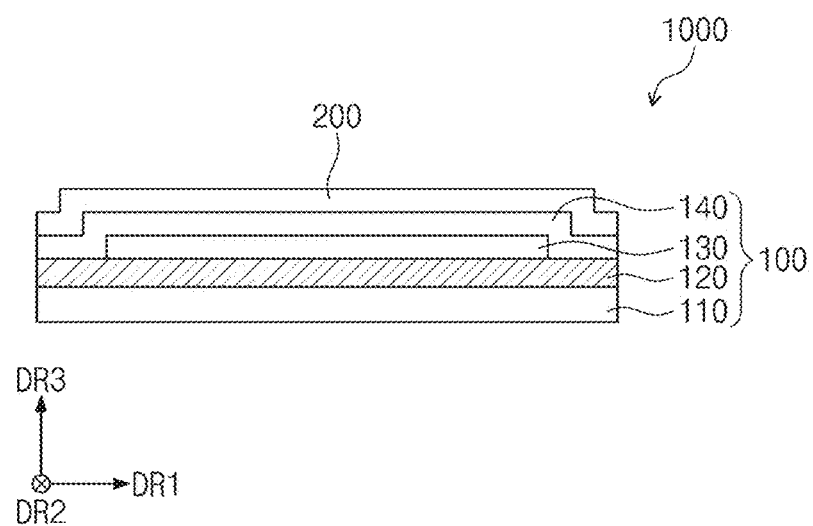
FIG. 3 is a cross-sectional view of the electronic device according to an embodiment of the inventive concept.

FIG. 3 is a cross-sectional view of the electronic device according to an embodiment of the inventive concept.

Referring to FIG. 3, the electronic device 1000 may include a display layer 100 and a sensor layer 200. The display layer 100 may include a base layer 110, a circuit layer 120, a light-emitting element layer 130, and an encapsulation layer 140.

In various embodiments, the base layer 110 may be a member configured to provide a base surface on which the circuit layer 120 is disposed. The base layer 110 may be a glass substrate, a metal substrate, or a polymer substrate; however, the embodiments of the inventive concept are not limited thereto, and the base layer 110 may be an inorganic layer, an organic layer, or a composite material layer.

In various embodiments, the base layer 110 may have a multi-layered structure. For example, the base layer 110 may include a first synthetic resin layer, a silicon oxide (SiOx) layer disposed on the first synthetic resin layer, an amorphous silicon (a-Si) layer disposed on the silicon oxide layer, and a second synthetic resin layer disposed on the amorphous silicon layer. The silicon oxide layer and the amorphous silicon layer may be referred to as a base barrier layer.

In various embodiments, each of the first and second synthetic resin layers may include a polyimide-based resin. In addition, each of the first and second synthetic resin layers may include at least one of an acrylate-based resin, a methacrylate-based resin, a polyisoprene-based resin, a vinyl-based resin, an epoxy-based resin, a urethane-based resin, a cellulose-based resin, a siloxane-based resin, a polyamide-based resin, or a perylene-based resin. It should be understood that in this specification, a "~~"-based resin means to include a functional group of "~~".

In various embodiments, the circuit layer 120 may be disposed on the base layer 110. The circuit layer 120 may include an insulating layer, a semiconductor pattern, a conductive pattern, and a signal line. An insulating layer, a semiconductor layer, and a conductive layer may be formed on the base layer 110 by a method such as coating or deposition. The insulating layer, the semiconductor layer, and the conductive layer may be selectively patterned through a plurality of photolithography processes. The semiconductor pattern, the conductive pattern, and the signal line included in the circuit layer 120 may be formed.

In various embodiments, the light-emitting element layer 130 may be disposed on the circuit layer 120. The light-emitting element layer 130 may include a light-emitting element. For example, the light-emitting element layer 130 may contain an organic light-emitting material, a quantum dot, a quantum rod, a micro LED, or a nano LED.

In various embodiments, the encapsulation layer 140 may be disposed on the light-emitting element layer 130. The encapsulation layer 140 may protect the light-emitting element layer 130 from moisture, oxygen, and foreign substances, such as dust particles.

In various embodiments, the sensor layer 200 may be formed on the display layer 100 through a continuous process, where the sensor layer 200 may be directly disposed on the display layer 100. Being directly disposed may mean that a third component is not disposed between the sensor layer 200 and the display layer 100, for example, a separate adhesive member may not be disposed between the sensor layer 200 and the display layer 100. Alternatively, the sensor layer 200 may be coupled to the display layer 100 by an adhesive member. The adhesive member may include an adhesive or a glue agent.

Figure 4:
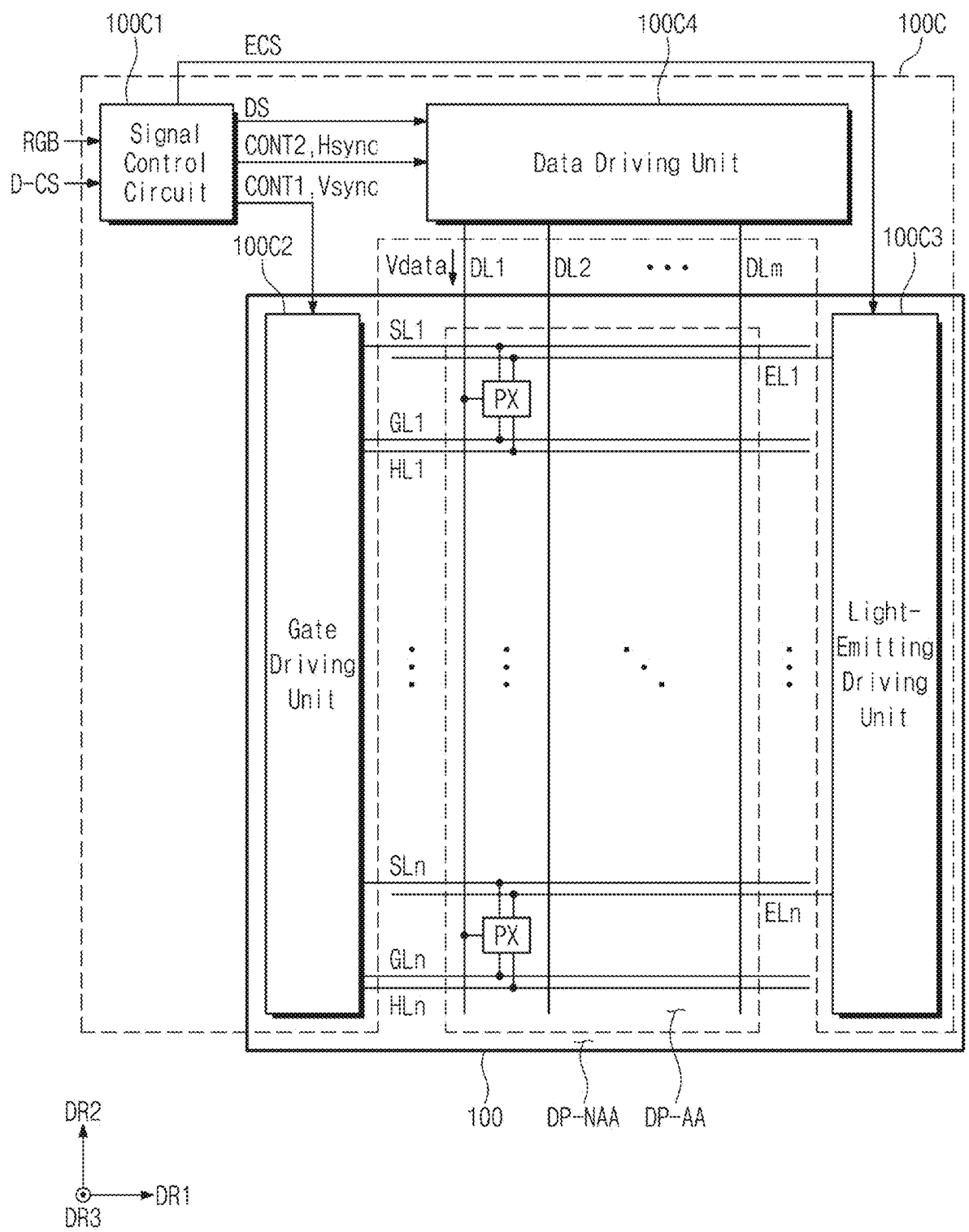
FIG. 4 is a block diagram of a display layer and a display driving unit according to an embodiment of the inventive concept.

FIG. 4 is a block diagram of a display layer and a display driving unit according to an embodiment of the inventive concept.

Referring to FIG. 4, a display active region DP-AA and a display peripheral region DP-NAA surrounding the display active region DP-AA may be defined in the display layer 100. The display active region DP-AA may be activated according to an electrical signal. The display active region DP-AA may overlap the active region AA (see FIG. 1) of the electronic device 1000 (see FIG. 1), and the display peripheral region DP-NAA may overlap the peripheral region NA (see FIG. 1) of the electronic device 1000 (see FIG. 1).

In various embodiments, the display layer 100 may include a plurality of first scan lines SL1 to SLn, a plurality of second scan lines GL1 to GLn, a plurality of third scan lines HL1 to HLn, a plurality of light-emitting control lines EL1 to ELn, a plurality of data lines DL1 to DLm, and a plurality of pixels PX. Each of the plurality of first scan lines SL1 to SLn, the plurality of second scan lines GL1 to GLn, the plurality of third scan lines HL1 to HLn, and the plurality of light-emitting control lines EL1 to ELn may extend in the first direction DR1, and each of the plurality of first scan lines SL1 to SLn, the plurality of second scan lines GL1 to GLn, the plurality of third scan lines HL1 to HLn, and the plurality of light-emitting control lines EL1 to ELn may be arranged to be spaced apart from each other in the second direction DR2. Each of the plurality of data lines DL1 to DLm may extend in the second direction DR2, and the plurality of data lines DL1 to DLm may be arranged to be spaced apart from each other in the first direction DR1.

In various embodiments, the display driving unit 100C may include a signal control circuit 100C1, a gate driving unit 100C2, a light-emitting driving unit 100C3, and a data driving unit 100C4. The display driving unit 100C may be referred to as a timing controller embedded data driver (TED) as the signal control circuit 100C1 and the data driving unit 100C4 are integrally provided.

In various embodiments, the signal control circuit 100C1 may receive an input image RGB and a control signal D-CS from the controller 1000C (see FIG. 3).

In various embodiments, the signal control circuit 100C1 may generate a first control signal CONT1, based on the control signal D-CS received by the signal control circuit 100C1, and a vertical synchronization signal Vsync, based on the control signal D-CS received by the signal control circuit 100C1. The signal control circuit 100C1 may output the first control signal CONT1 and the vertical synchronization signal Vsync to the gate driving unit 100C2, where the vertical synchronization signal Vsync may be included in the first control signal CONT1.

In various embodiments, the signal control circuit 100C1 may generate a second control signal CONT2, based on the control signal D-CS received by the signal control circuit 100C1, and generate a horizontal synchronization signal Hsync, based on the control signal D-CS received by the signal control circuit 100C1. The signal control circuit 100C1 may output the second control signal CONT2 and the horizontal synchronization signal Hsync to the data driving unit 100C4, where the horizontal synchronization signal Hsync may be included in the second control signal CONT2.

In various embodiments, the signal control circuit 100C1 may generate a third control signal ECS, based on the control signal D-CS received by the signal control circuit 100C1, and output the third control signal ECS to the light-emitting driving unit 100C3.

In various embodiments, the signal control circuit 100C1 may output, to the data driving unit 100C4, a data signal DS obtained by processing an input image RGB, where the data signal DS may be configured for the operating conditions of the display layer 100. The first control signal CONT1 and the second control signal CONT2 may be used for the operation of the gate driving unit 100C2 and the data driving unit 100C4.

In various embodiments, the signal control circuit 100C1 may be referred to as a timing controller.

In various embodiments, the gate driving unit 100C2 may supply a gate pulse synchronized with the data voltage Vdata in response to the first control signal CONT1 and the vertical synchronization signal Vsync to the plurality of first scan lines SL1 to SLn, the plurality of second scan lines GL1 to GLn, and the plurality of third scan lines HL1 to HLn. In an embodiment, the gate driving unit 100C2 may be formed through the same process as the circuit layer 120 (see FIG. 4) in the display layer 100, but the embodiment of the inventive concept is not limited thereto. The gate driving unit 100C2 may be electrically connected to the display layer 100 by being directly mounted on a predetermined region of the display layer 100 as an integrated circuit (IC) or by being mounted on a separate printed circuit board in a chip-on-film (COF) method. The gate driving unit 100C2 may supply a gate pulse synchronized with the data voltage Vdata to gate lines of the display layer 100 during the data input section.

In various embodiments, the light-emitting driving unit 100C3 receives the third control signal ECS from the signal control circuit 100C1. The light driving unit 100C3 may output light-emitting control signals to the light-emitting control lines EL1 to ELn in response to the third control signal ECS.

In various embodiments, the data driving unit 100C4 may supply the data voltage Vdata to the plurality of data lines DL1 to DLm in response to the second control signal CONT2, the horizontal synchronization signal Hsync, and the data signal DS from the signal control circuit 100C1. The data voltage Vdata may be an analog voltage which corresponds to the grayscale value of the data signal DS.

Figure 8:
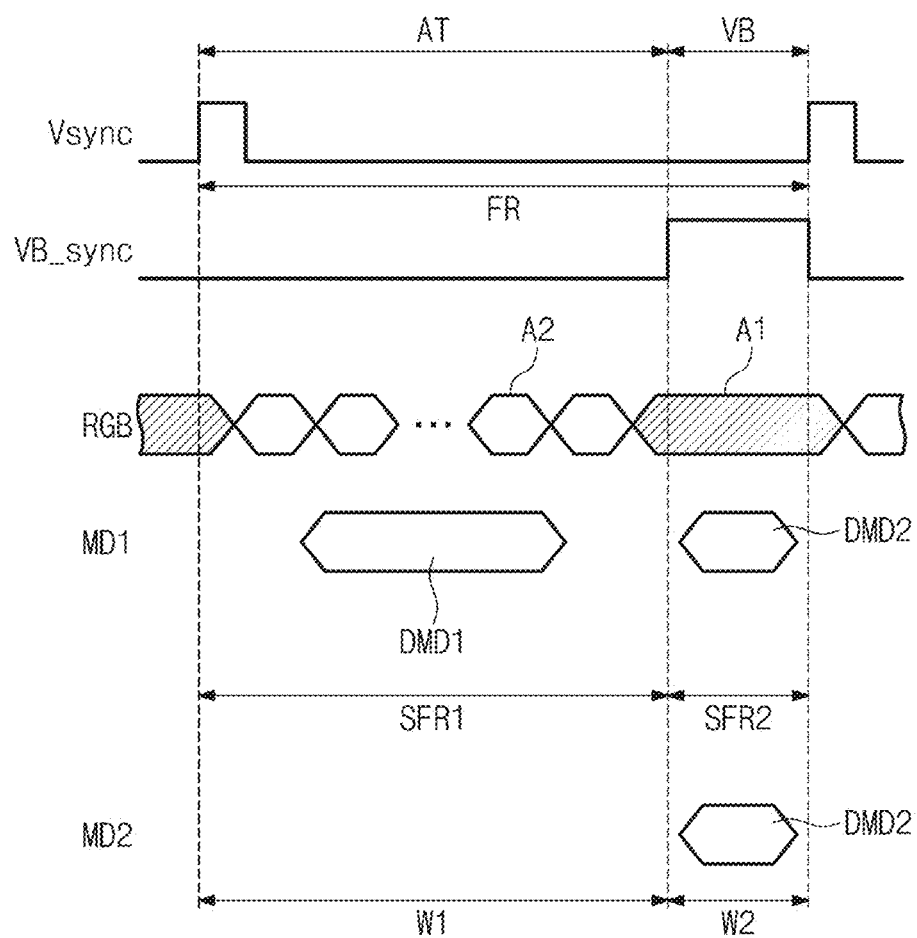
FIG. 8 is a waveform diagram of signals applied by a touch driving unit and a driving unit according to an embodiment of the inventive concept.

In an embodiment, the data driving unit 100C4 may output a corresponding data voltage Vdata to each of the data lines DL1 to DLm during the section of a display frame FR (see FIG. 8).

In various embodiments, the data driving unit 100C4 may be electrically connected to the display layer 100, where the data driving unit 100C4 may be directly mounted on a predetermined region of the display layer 100, as an integrated circuit or by being mounted on a separate printed circuit board in a chip-on-film method. The data driving unit 100C4 may be formed through the same process as the circuit layer 120 (see FIG. 4) in the display layer 100. The data driving unit 100C4 may also be referred to as a data driver.

Figure 5:
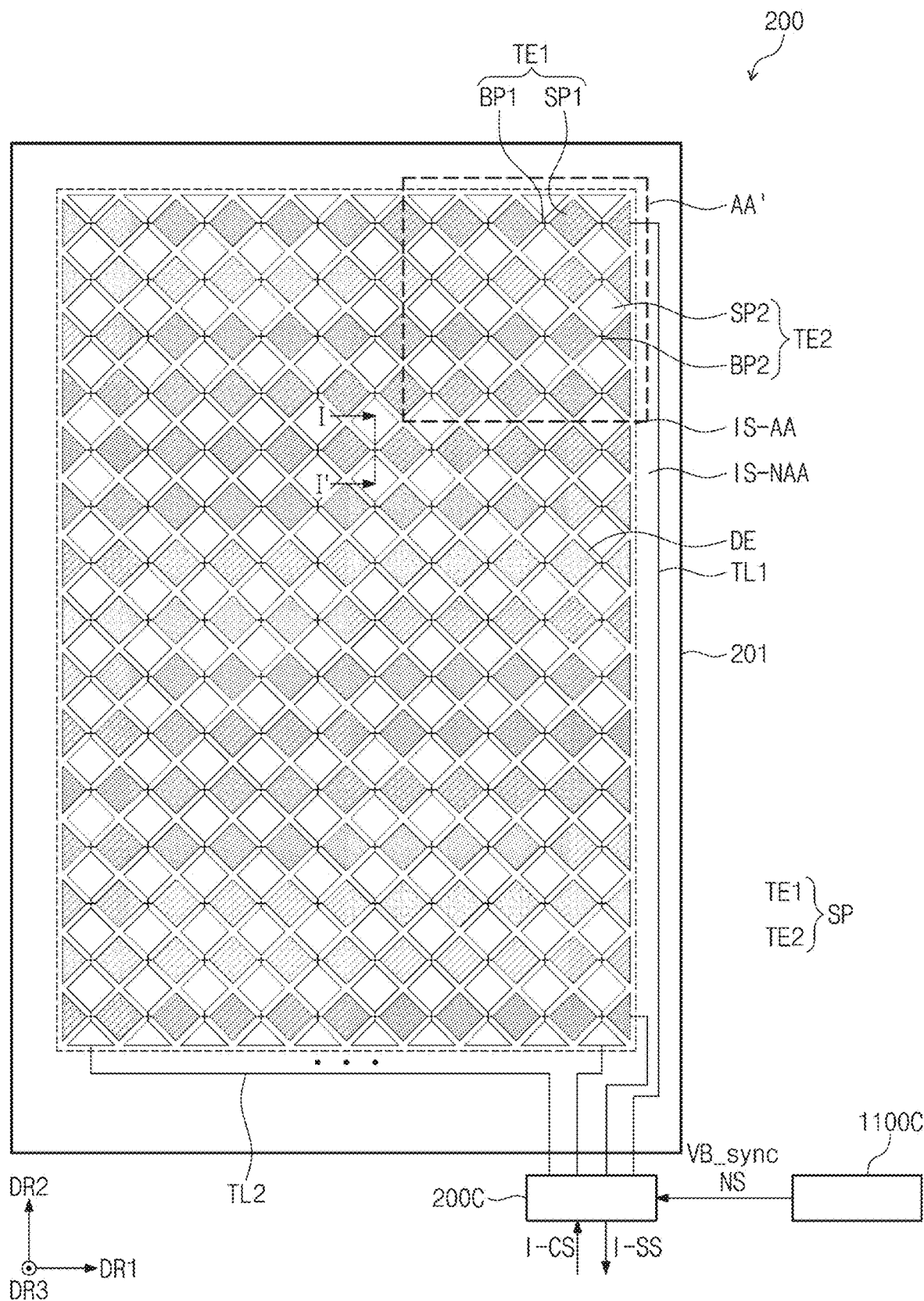
FIG. 5 illustrates a sensor layer and a touch driving unit according to an embodiment of the inventive concept.

FIG. 5 illustrates a sensor layer and a touch driving unit according to an embodiment of the inventive concept.

Referring to FIG. 5, the sensor layer 200 may include a sensor active region IS-AA and a sensor peripheral region IS-NAA adjacent to the sensor active region IS-AA. The sensor active region IS-AA may be activated according to an electrical signal, where the sensor active region IS-AA may sense an input. When viewed on a plane, the sensor active region IS-AA may overlap the display active region DP-AA (see FIG. 4) of the display layer 100 (see FIG. 4). The sensor peripheral region IS-NAA may overlap the display peripheral region DP-NAA (see FIG. 4) of the display layer 100 (see FIG. 4).

In various embodiments, the sensor layer 200 may include a base layer 201, a plurality of sensing electrodes SP, and a plurality of sensing lines TL1 and TL2. The plurality of sensing electrodes SP may be disposed in the sensor active region IS-AA. The plurality of sensing lines TL1 and TL2 may be disposed in the sensor peripheral region IS-NAA.

In various embodiments, the base layer 201 may be an inorganic layer containing silicon nitride, silicon oxynitride, and/or silicon oxide. The base layer 201 may be an organic layer containing an epoxy resin, an acrylic resin, or an imide-based resin. The base layer 201 may be directly formed on the display layer 100 (see FIG. 4).

In various embodiments, the plurality of sensing electrodes SP may include a plurality of first sensing electrodes TE1 and a plurality of second sensing electrodes TE2. The sensor layer 200 may obtain information on an external input through a change in capacitance between the plurality of first sensing electrodes TE1 and the plurality of second sensing electrodes TE2.

In various embodiments, each of the plurality of first sensing electrodes TE1 may extend along the first direction DR1, and the plurality of first sensing electrodes TE1 may be arranged along the second direction DR2. Each of the plurality of first sensing electrodes TE1 may include a plurality of first sensing patterns SP1 and a plurality of first connection patterns BP1. Each of the plurality of first connection patterns BP1 may electrically connect two adjacent first sensing patterns SP1 to each other. The plurality of first sensing patterns SP1 and the plurality of first connection patterns BP1 may have a mesh structure. The plurality of first sensing patterns SP1 may be referred to as a plurality of first sensing units SP1. The plurality of first connection patterns BP1 may be referred to as a plurality of first connection units BP1. The plurality of first sensing electrodes TE1 may be referred to as a plurality of sensing electrodes.

In various embodiments, each of the plurality of second sensing electrodes TE2 may extend along the second direction DR2, and the plurality of second sensing electrodes TE2 may be arranged along the first direction DR1. Each of the plurality of second sensing electrodes TE2 may include a plurality of second sensing patterns SP2 and a plurality of second connection patterns BP2. Each of the plurality of second connection patterns BP2 may electrically connect two adjacent second sensing patterns SP2 to each other. The plurality of second sensing patterns SP2 and the plurality of second connection patterns BP2 may have a mesh structure. The plurality of second sensing patterns SP2 may be referred to as a plurality of second sensing units SP2. The plurality of second connection patterns BP2 may be referred to as a plurality of second connection units BP2.

In various embodiments, the plurality of first connection patterns BP1 may be disposed on a layer different from that of the plurality of second connection patterns BP2. The plurality of second connection patterns BP2 may be insulated from and cross the plurality of first sensing electrodes TE1. For example, the plurality of first connection patterns BP1 may be respectively insulated from and cross the plurality of second connection patterns BP2.

FIG. 5 illustrates the plurality of sensing electrodes SP having a tetragonal shape, but the inventive concept is not limited thereto. For example, the plurality of sensing electrodes SP may have a polygonal shape.

In various embodiments, the plurality of sensing electrodes SP may contain a conductive material. For example, the conductive material may include a metal or an alloy thereof. The metal may include gold (Au), silver (Ag), aluminum (Al), molybdenum (Mo), chromium (Cr), titanium (Ti), nickel (Ni), neodymium (Nd), copper (Cu), platinum (Pt) and the like. The plurality of sensing electrodes SP may be composed of a transparent conductive material where the transparent conductive material may include silver nano wire (AgNW), indium tin oxide (ITO), indium zinc oxide (IZO), antimony zinc oxide (AZO), indium tin zinc oxide (ITZO), zinc oxide (ZnO), tin oxide (SnO2), carbon nano tube, graphene, and the like. The plurality of sensing electrodes SP may be composed of a single layer or multiple layers.

In various embodiments, the plurality of sensing lines TL1 and TL2 may include a plurality of first sensing lines TL1 and a plurality of second sensing lines TL2. The plurality of first sensing lines TL1 may be respectively electrically connected to the plurality of first sensing electrodes TE1. The plurality of second sensing lines TL2 may be respectively electrically connected to the plurality of second sensing electrodes TE2.

In various embodiments, the touch driving unit 200C may receive a control signal I-CS from the controller 1000C (see FIG. 2). The touch driving unit 200C may receive a sync signal VB_sync and a noise value NS from the driving unit 1100C.

Based on the sync signal VB_sync, the touch driving unit 200C may control the plurality of sensing electrodes SP in a first driving mode DMD1 (see FIG. 8) or a second driving mode DMD2 (see FIG. 8).

In various embodiments, the touch driving unit 200C may receive the noise value NS and operate in a first mode MD1 (see FIG. 8) or a second mode MD2 (see FIG. 8) based on the received noise value NS. A detailed description of this will be given later.

Figure 6:
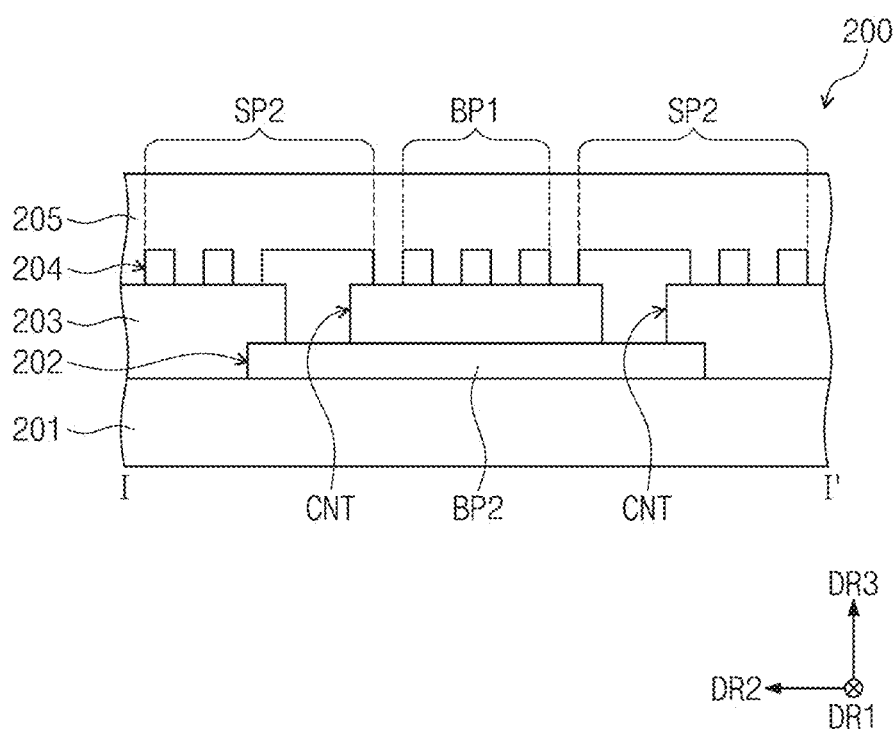
FIG. 6 is a cross-sectional view taken along line I-I' of FIG. 5 according to an embodiment of the inventive concept.

FIG. 6 is a cross-sectional view taken along line I-I' of FIG. 5 according to an embodiment of the inventive concept.

Referring to FIGS. 5 and 6, the sensor layer 200 may include a base layer 201, a first conductive layer 202, a sensing insulating layer 203, a second conductive layer 204, and a cover insulating layer 205.

In various embodiments, the first conductive layer 202 may be disposed on the base layer 201. The first conductive layer 202 may include a plurality of second connection patterns BP2. The plurality of second connection patterns BP2 may have a mesh structure.

In various embodiments, the sensing insulating layer 203 may be disposed on the first conductive layer 202, where the sensing insulating layer 203 may have a single-layered or multi-layered structure. The sensing insulating layer 203 may contain an inorganic material, an organic material, or a composite material.

In various embodiments, the second conductive layer 204 may be disposed on the sensing insulating layer 203. The second conductive layer 204 may include a plurality of first sensing patterns SP1, a plurality of first connection patterns BP1, and a plurality of second sensing patterns SP2. The plurality of first sensing patterns SP1, the plurality of second sensing patterns SP2, and the plurality of first connection patterns BP1 may have a mesh structure.

In various embodiments, each of the first conductive layer 202 and the second conductive layer 204 may have a single-layered structure or a multi-layered structure in which layers are stacked in the third direction DR3.

In various embodiments, a plurality of contact holes CNT may be formed through the sensing insulating layer 203 in the third direction DR3. Two adjacent second sensing patterns SP2 among the plurality of second sensing patterns SP2 may be electrically connected to the second connection pattern BP2 through the plurality of contact holes CNT.

In various embodiments, the cover insulating layer 205 may be disposed on the plurality of first sensing patterns SP1, the plurality of first connection patterns BP1, and the plurality of sensing patterns SP2. The cover insulating layer 205 may have a single-layered or multi-layered structure. The cover insulating layer 205 may include an inorganic material, an organic material, or a composite material.

FIG. 6 illustrates a bottom bridge structure in which the plurality of second connection patterns BP2 are disposed below the plurality of first sensing patterns SP1, the plurality of first connection patterns BP1, and the plurality of second sensing patterns SP2, but the inventive concept is not limited thereto. For example, the sensor layer 200 may have a top bridge structure in which the plurality of second connection patterns BP2 are disposed above the plurality of first sensing patterns SP1, the plurality of first connection patterns BP1, and the plurality of second sensing patterns SP2.

Figure 7:
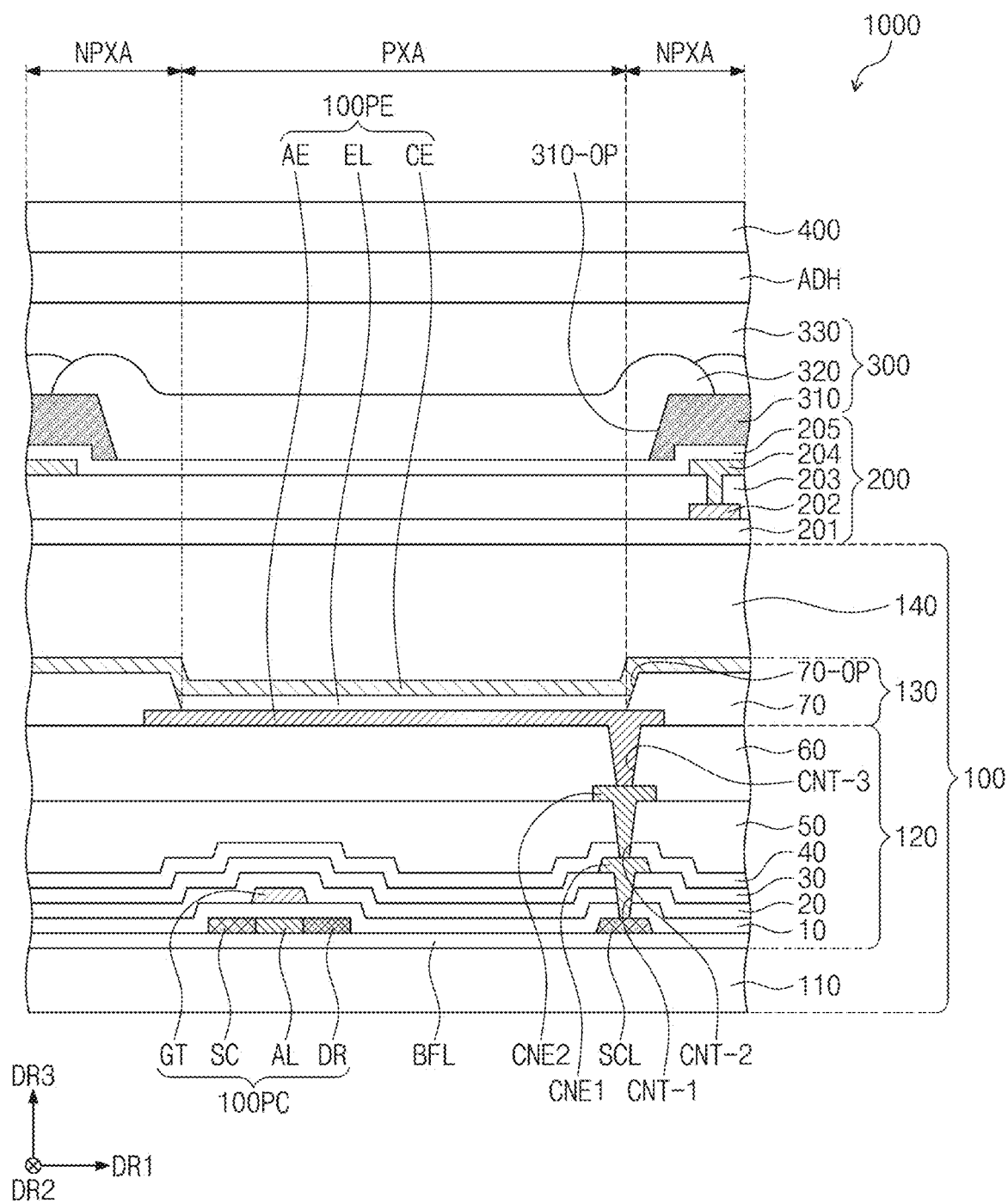
FIG. 7 is a cross-sectional view of the electronic device according to an embodiment of the inventive concept.

FIG. 7 is a cross-sectional view of the electronic device according to an embodiment of the inventive concept. In the description of FIG. 7, the same reference numerals are used for the components described through FIGS. 3 and 6, and the descriptions thereof are omitted.

Referring to FIG. 7, the electronic device 1000 may include a display layer 100, a sensor layer 200, an anti-reflection layer 300, an adhesive layer ADH, and a window 400. The adhesive layer ADH may be disposed between the anti-reflection layer 300 and the window 400. The adhesive layer ADH may include an adhesive or a glue agent having light transmittance.

In various embodiments, at least one inorganic layer may be formed on the upper surface of the base layer 110. The inorganic layer may contain at least one of aluminum oxide, titanium oxide, silicon oxide, silicon nitride, silicon oxynitride, zirconium oxide, or hafnium oxide. The inorganic layer may be formed of multiple layers. The multi-layered inorganic layers may constitute a barrier layer and/or a buffer layer.

In an embodiment, the display layer 100 may include a buffer layer BFL. The buffer layer BFL may improve bonding strength between the base layer 110 and the semiconductor pattern. The buffer layer BFL may contain at least one of silicon oxide, silicon nitride, or silicon oxynitride. For example, the buffer layer BFL may include a structure in which a silicon oxide layer and a silicon nitride layer are alternately stacked.

In various embodiments, the semiconductor pattern may be disposed on the buffer layer BFL. The semiconductor pattern may correspond to one of a plurality of patterns of the semiconductor layer disposed on the buffer layer BFL. The semiconductor pattern may contain metal oxide. In an embodiment of the inventive concept, the semiconductor pattern may contain polysilicon. Without being limited thereto, however, the semiconductor pattern may contain amorphous silicon, low-temperature polycrystalline silicon, or oxide semiconductor.

In various embodiments, a metal oxide semiconductor may include a crystalline or amorphous metal oxide semiconductor. For example, the metal oxide semiconductor may include a metal oxide containing zinc (Zn), indium (In), gallium (Ga), tin (Sn), titanium (Ti), or the like, or a mixture of a metal such as zinc (Zn), indium (In), gallium (Ga), tin (Sn), or titanium (Ti), and an oxide thereof. The oxide semiconductor may include indium-tin oxide (ITO), indium-gallium-zinc oxide (IGZO), zinc oxide (ZnO), indium-zinc oxide (IZnO), zinc-indium oxide (ZIO), indium oxide (InO), titanium oxide (TiO), indium-zinc-tin oxide (IZTO), zinc-tin oxide (ZTO), and the like.

In various embodiments, the semiconductor pattern may include a plurality of regions divided according to whether or not a metal oxide is reduced. A region (hereinafter referred to as a reduced region) in which the metal oxide is reduced has higher conductivity than a region (hereinafter referred to as a non-reduced region) in which the metal oxide is not reduced. The reduced region substantially serves as a source/drain or signal line of a transistor. The non-reduced region substantially corresponds to a semiconductor region (or channel) of the transistor. In other words, a portion of the semiconductor pattern may be a semiconductor region of a transistor, another portion thereof may be a source/drain of the transistor, and still another portion thereof may be a signal transmission region.

In various embodiments, each of the pixels may have an equivalent circuit including five transistors, two capacitors, and a light-emitting element, and the equivalent circuit diagram of a pixel may be modified in various forms. FIG. 7 illustrates one transistor 100PC and a light-emitting element 100PE included in a pixel.

In various embodiments, a source region SC, an active region AL, and a drain region DR of the transistor 100PC may be formed from a semiconductor pattern. The source region SC and the drain region DR may extend in opposite directions from each other from the active region AL on a cross section. FIG. 7 illustrates a portion of a connection signal line SCL formed from the semiconductor pattern. Although not separately illustrated, the connection signal line SCL may be connected to the drain region DR of the transistor 100PC on a plane.

In various embodiments, a first insulating layer 10 may be disposed on the buffer layer BFL. The first insulating layer 10 may overlap a plurality of pixels in common and cover the semiconductor pattern. The first insulating layer 10 may be an inorganic layer and/or an organic layer and have a single-layered or multi-layered structure. The first insulating layer 10 may contain at least one of aluminum oxide, titanium oxide, silicon oxide, silicon nitride, silicon oxynitride, zirconium oxide, or hafnium oxide. In various embodiments, the first insulating layer 10 may be a single-layered silicon oxide layer. An insulating layer of the circuit layer 120, as well as the first insulating layer 10, may be an inorganic layer and/or an organic layer and have a single-layered or multi-layered structure. The inorganic layer may contain at least one of the above-described materials, but the inventive concept is not limited thereto.

In various embodiments, a gate GT of the transistor 100PC is disposed on the first insulating layer 10. The gate GT may be a portion of a metal pattern. The gate GT overlaps the active region AL. In a process of doping the semiconductor pattern, the gate GT may function as a mask.

In various embodiments, a second insulating layer 20 may be disposed on the first insulating layer 10 and cover the gate GT. The second insulating layer 20 may be an inorganic layer and/or an organic layer, and may have a single-layered or multi-layered structure. The second insulating layer 20 may contain at least one of silicon oxide, silicon nitride, or silicon oxynitride. In various embodiments, the second insulating layer 20 may have a multi-layered structure including a silicon oxide layer and a silicon nitride layer.

In various embodiments, a third insulating layer 30 may be disposed on the second insulating layer 20, where the third insulating layer 30 may have a single-layered or multi-layered structure. For example, the third insulating layer 30 may have a multi-layered structure including a silicon oxide layer and a silicon nitride layer.

In various embodiments, a first connection electrode CNE1 may be disposed on the third insulating layer 30. The first connection electrode CNE1 may be connected to the connection signal line SCL through a contact hole CNT-1 passing through the first, second, and third insulating layers 10, 20, and 30.

In various embodiments, a fourth insulating layer 40 may be disposed on the third insulating layer 30. The fourth insulating layer 40 may be a single-layered silicon oxide layer.

In various embodiments, a fifth insulating layer 50 may be disposed on the fourth insulating layer 40. The fifth insulating layer 50 may be an organic layer.

In various embodiments, a second connection electrode CNE2 may be disposed on the fifth insulating layer 50. The second connection electrode CNE2 may be connected to the first connection electrode CNE1 through a contact hole CNT-2 passing through the fourth insulating layer 40 and the fifth insulating layer 50.

In various embodiments, a sixth insulating layer 60 may be disposed on the fifth insulating layer 50 and cover the second connection electrode CNE2. The sixth insulating layer 60 may be an organic layer.

In various embodiments, the light-emitting element layer 130 may be disposed on the circuit layer 120. The light-emitting element layer 130 may include a light-emitting element 100PE and a pixel defining film 70. The light-emitting element layer 130 may contain an organic light-emitting material, an inorganic light-emitting material, an organic-inorganic light-emitting material, a quantum dot, a quantum rod, a micro LED, or a nano LED. Hereinafter, the light-emitting element 100PE is exemplarily described as an organic light-emitting element, but the inventive concept is not limited thereto.

In various embodiments, the light-emitting element 100PE may include a first electrode AE, a light-emitting layer EL, and a second electrode CE.

In various embodiments, the first electrode AE may be disposed on the sixth insulating layer 60. The first electrode AE may be connected to the second connection electrode CNE2 through a contact hole CNT-3 passing through the sixth insulating layer 60.

In various embodiments, the pixel defining film 70 may be disposed on the sixth insulating layer 60 and cover a portion of the first electrode AE. An opening 70-OP is defined in the pixel defining film 70, where the opening 70-OP of the pixel defining film 70 exposes at least a portion of the first electrode AE.

In various embodiments, the active region AA (see FIG. 1) may include a light-emitting region PXA and a non-light-emitting region NPXA adjacent to the light-emitting region PXA, where a non-light-emitting region NPXA may be on each of opposite sides of the light-emitting region PXA. The non-light-emitting region NPXA may surround the light-emitting region PXA. In this embodiment, the light-emitting region PXA is defined to correspond to a partial region of the first electrode AE exposed by the opening 70-OP.

In various embodiments, the light-emitting layer EL may be disposed on the first electrode AE. The light-emitting layer EL may be disposed in a region corresponding to the opening 70-OP in the pixel defining film 70, where the light-emitting layer EL may be separately formed for each of the pixels. When the light-emitting layer EL is dividedly formed for each of the pixels, each of the light-emitting layers EL may emit light of at least one of blue, red, or green. Without being limited thereto, however, the light-emitting layer EL may be connected to the pixels, so as to be included in common therein. In this case, the light-emitting layer EL may provide blue light or white light.

In various embodiments, the second electrode CE may be disposed on the light-emitting layer EL. The second electrode CE may have an integral shape and be commonly included in a plurality of pixels. The second electrode CE may extend over the pixel defining film 70.

In various embodiments, a hole control layer may be disposed between the first electrode AE and the light-emitting layer EL. The hole control layer may be formed in the light-emitting region PXA and the non-light-emitting region NPXA. The hole control layer may include a hole transport layer and further include a hole injection layer. An electron control layer may be disposed between the light-emitting layer EL and the second electrode CE. The electron control layer may include an electron transport layer and further include an electron injection layer. The hole control layer and the electron control layer may be commonly formed in a plurality of pixels by using an open mask or an inkjet process.

In various embodiments, the encapsulation layer 140 may be disposed on the light-emitting element layer 130. The encapsulation layer 140 may include an inorganic layer, an organic layer, and an inorganic layer which are sequentially stacked, but layers constituting the encapsulation layer 140 are not limited thereto. The inorganic layers may protect the light-emitting element layer 130 from moisture and oxygen, and the organic layer may protect the light-emitting element layer 130 from foreign substances such as dust particles. The inorganic layers may include a silicon nitride layer, a silicon oxynitride layer, a silicon oxide layer, a titanium oxide layer, an aluminum oxide layer, or the like. The organic layer may include an acrylic-based organic layer, but the inventive concept is not limited thereto.

In various embodiments, the sensor layer 200 may include a base layer 201, a first conductive layer 202, a sensing insulating layer 203, a second conductive layer 204, and a cover insulating layer 205.

In various embodiments, the base layer 201 may have a single-layered structure or a multi-layered structure in which layers are stacked in the third direction DR3.

In various embodiments, each of the first conductive layer 202 and the second conductive layer 204 may have a single-layered structure or a multi-layered structure in which layers are stacked in the third direction DR3.

In various embodiments, a single-layered conductive layer may include a metal layer or a transparent conductive layer. The metal layer may include molybdenum, silver, titanium, copper, aluminum, or an alloy thereof. The transparent conductive layer may contain a transparent conductive oxide, such as indium-tin oxide (ITO), indium-zinc oxide (IZnO), zinc oxide (ZnO), or indium-zinc-tin oxide (IZTO). In addition, the transparent conductive layer may contain a conductive polymer such as poly (3,4-ethylenedioxythiophene) (PEDOT), metal nanowire, graphene, and the like.

In various embodiments, a multi-layered conductive layer may include metal layers. The metal layers may have, for example, a three-layer structure of titanium/aluminum/titanium. The multi-layered conductive layer may include at least one metal layer and at least one transparent conductive layer.

In various embodiments, the sensing insulating layer 203 and the cover insulating layer 205 may include an inorganic film. The inorganic film may contain at least one of aluminum oxide, titanium oxide, silicon oxide, silicon nitride, silicon oxynitride, zirconium oxide, or hafnium oxide.

In various embodiments, the sensing insulating layer 203 and the cover insulating layer 205 may include an organic film. The organic film may include at least one of an acrylic-based resin, a methacrylic-based resin, polyisoprene, a vinyl-based resin, an epoxy-based resin, a urethane-based resin, a cellulose-based resin, a siloxane-based resin, a polyimide-based resin, a polyamide-based resin, or a perylene-based resin.

In various embodiments, the anti-reflection layer 300 may be disposed on the sensor layer 200. The anti-reflection layer 300 may include a partition layer 310, a plurality of color filters 320, and a planarization layer 330.

In various embodiments, the partition layer 310 may be disposed to overlap the conductive pattern of the second conductive layer 204. The cover insulating layer 205 may be disposed between the partition layer 310 and the second conductive layer 204. In another embodiment of the inventive concept, the cover insulating layer 205 may be omitted.

In various embodiments, the partition layer 310 may prevent external light from being reflected by the second conductive layer 204. A material constituting the partition layer 310 is not particularly limited as long as the material can absorb light. The partition layer 310 may be a layer having a black color, and in an embodiment of the inventive concept, the partition layer 310 may include a black coloring agent. The black coloring agent may include a black dye and/or a black pigment. The black coloring agent may include carbon black, a metal such as chromium, or an oxide thereof.

In various embodiments, a partition opening 310-OP may be defined in the partition layer 310, where the partition opening 310-OP may overlap the light-emitting layer EL. The color filter 320 may be disposed to correspond to the partition opening 310-OP. The color filter 320 may transmit light of a predetermined wavelength band provided from the light-emitting layer EL overlapping with the color filter 320.

In various embodiments, the planarization layer 330 may cover the partition layer 310 and the color filter 320. The planarization layer 330 may contain an organic material and provide a flat surface on the upper surface of the planarization layer 330. In an embodiment of the inventive concept, the planarization layer 330 may be omitted.

In an embodiment of the inventive concept, the anti-reflection layer 300 may include a reflection control layer instead of the color filters 320. For example, the color filters 320 may be omitted and the reflection control layer may be added in the place in which the color filters 320 are omitted. The reflection control layer may selectively absorb light in a partial band of wavelengths among the light reflected from the inside of a display panel, and/or an electronic device or light incident from the outside of the display panel, and/or the electronic device.

For example, as the reflection control layer absorbs light of a first wavelength range of about 490 nm to about 505 nm and a second wavelength range of about 585 nm to about 600 nm, light transmittance in the first wavelength range and the second wavelength range may be controlled to be about 40% or less. The reflection control layer may absorb light having a wavelength that does not belong to the wavelength range of red, green, and blue light emitted from the light-emitting layer EL. In this way, by absorbing light having the wavelength that does not belong to the wavelength range of red, green, and blue light emitted from the light-emitting layer EL, the reflection control layer may prevent or minimize the decrease in luminance of the display panel and/or the electronic device. In addition, at the same time, deterioration in luminous efficiency of the display panel and/or the electronic device may be prevented or minimized, and visibility may be improved.

In various embodiments, the reflection control layer may include an organic material layer containing a dye, a pigment, or a combination thereof. The reflection control layer may contain a tetraazaporphyrin (TAP)-based compound, a porphyrin-based compound, a metal porphyrin-based compound, an oxazine-based compound, a squarylium-based compound, a triarylmethane-based compound, a polymethine-based compound, a traquinone-based compound, a phthalocyanine-based compound, an azo-based compound, a perylene-based compound, a xanthene-based compound, a diimmonium-based compound, a dipyrromethene-based compound, a cyanine-based compound, and combinations thereof.

In an embodiment, the reflection control layer may have a transmittance of about 64% to about 72%. The transmittance of the reflection control layer may be adjusted according to the amount of pigment and/or dye contained in the reflection control layer.

In an embodiment, the anti-reflection layer 300 may include a polarizing film instead of the partition layer 310, the plurality of color filters 320, and the planarization layer 330. For example, the anti-reflection layer 300 may include a retarder and a polarizer. The retarder may be a film type or a liquid crystal coating type and include a $\lambda/2$ retarder and/or a $\lambda/4$ retarder. The polarizer may also be a film type and include a stretchable synthetic resin film. The retarder and the polarizer may further include a protective film. The retarder and the polarizer themselves or the protective film may be a base layer of the anti-reflection layer 300.

In various embodiments, the adhesive layer ADH may be disposed between the anti-reflection layer 300 and the window 400. The adhesive layer ADH may contain an optical clear adhesive, an optically clear adhesive resin, or a pressure sensitive adhesive (PSA).

In various embodiments, the window 400 may be disposed on the anti-reflection layer 300. The window 400 may contain an optically transparent insulating material, where for example, the window 400 may contain glass or plastic. The window 400 may have a multi-layered structure or a single-layered structure. For example, the window 400 may include a plurality of plastic films bonded together with an adhesive or include a glass substrate and a plastic film bonded together with an adhesive.

FIG. 8 is a waveform diagram of signals applied by a touch driving unit and a driving unit according to an embodiment of the inventive concept.

Referring to FIGS. 2, 4, 5, and 8, the driving unit 1100C may sense a noise value NS to be applied to the sensor layer 200, based on an input image RGB of a next display frame FR. For example, the noise value NS according to the input image RGB may be stored in the form of a lookup table in the memory of the driving unit 1100C. The driving unit 1100C may transmit the sensed noise value NS to the touch driving unit 200C. The touch driving unit 200C may operate in the first mode MD1 or the second mode MD2, based on the noise value NS.

In various embodiments, the display layer 100 may display an image IM (see FIG. 1) in the unit of one display frame FR. One display frame FR may be defined as a section from a rising edge of the vertical synchronization signal Vsync to a next rising edge thereof. However, this is an example and the definition of the display frame FR according to an embodiment of the inventive concept is not limited thereto. For example, one display frame FR may be defined as a section from a falling edge of the vertical synchronization signal Vsync to a next falling edge thereof.

In various embodiments, a display refresh rate of the display layer 100 may have a first frequency. The first frequency may be about 120 Hz. However, this is an example and the display refresh rate according to an embodiment of the inventive concept is not limited thereto, where for example, the display refresh rate may be about 60 Hz.

In various embodiments, one display frame FR may include a blank section VB and a data input section AT. A sync signal VB_sync may be defined by the data input section AT and the blank section VB. The blank section VB may be a section in which the sync signal VB_sync is activated, and the data input section AT may be a section in which the sync signal VB_sync is inactivated. For example, the sync signal VB_sync may be a flag signal for distinguishing the blank section VB.

In various embodiments, the input image RGB may include a first portion A1 and a second portion A2. The first portion A1 may be a portion to which data of the input image RGB are not provided. The second portion A2 may be a portion to which data of the input image RGB are provided.

In various embodiments, the data input section AT may be a section in which the second portion A2 is provided to the display layer 100. In the data input section AT, the data voltage Vdata may be provided to the display layer 100, based on the input image RGB on the display layer 100. The blank section VB may be a section in which the first portion A1 is provided to the display layer 100. In the blank section VB, the data voltage Vdata may not be provided to the display layer 100 based on the input image RGB. The width of the blank section VB may be smaller than that of the data input section AT.

In various embodiments, the touch driving unit 200C may sense the sensor layer 200 in units of sensing frames SFR1 and SFR2. A touch report rate of the sensor layer 200 may have a second frequency. The first frequency may be lower than or equal to the second frequency. For example, the touch report rate may be about 240 Hz or about 120 Hz. However, this is an example and the touch report rate according to the inventive concept is not limited thereto. For example, the touch report rate may be equal to the display refresh rate or twice the display refresh rate.

In various embodiments, the sensing frames SFR1 and SFR2 may include a first sensing frame SFR1 and a second sensing frame SFR2. A first section W1 of the first sensing frame SFR1 may overlap the data input section AT, and a second section W2 of the second sensing frame SFR2 may overlap the blank section VB. The first section W1 and the second section W2 may be distinguished by the sync signal VB_syn. The width of the second sensing frame SFR2 may be smaller than that of the first sensing frame SFR1.

In various embodiments, the sync signal VB_sync may be transmitted from the driving unit 1100C to the touch driving unit 200C. The first section W1 may be a section in which the sync signal VB_sync is inactivated, and the second section W2 may be a section in which the sync signal VB_sync is activated. The width of the second section W2 may be smaller than that of the first section W1.

In various embodiments, the driving unit 1100C may sense a noise value NS, based on the input image RGB to be provided in a next display frame FR, and transmit the noise value NS to the touch driving unit 200C. Based on the noise value NS, the touch driving unit 200C may operate in the first mode MD1 or in the second mode MD2. The touch driving unit 200C may operate in the first mode MD1 in response to the noise value NS being less than a predetermined noise level, and the touch driving unit 200C may operate in the second mode MD2 in response to the noise value NS being greater than or equal to a predetermined noise level.

In various embodiments, in the first mode MD1, the touch driving unit 200C may operate in the first driving mode DMD1 in the first section W1. Operating in the first driving mode DMD1 may result in sequentially applying a plurality of touch driving signals TX1, TX2, TX3, and TX4 (see FIG. 9) to each of the plurality of first sensing electrodes TE1.

In various embodiments, in the first mode MD1, the touch driving unit 200C may operate in the second driving mode DMD2 in the second section W2. Operating in the second driving mode DMD2 may result in simultaneously applying a plurality of touch driving signals TX1, TX2, TX3, and TX4 (see FIG. 9) to the plurality of first sensing electrodes TE1.

In various embodiments, in the first mode MD1, the display refresh rate of the display layer 100 may be lower than the touch report rate of the sensor layer 200. For example, the display refresh rate of the display layer 100 may be about 120 Hz, and the touch report rate of the sensor layer 200 may be about 240 Hz.

In various embodiments, in the second mode MD2, the touch driving unit 200C may operate in the second driving mode DMD2 only in the second section W2. In this case, the touch driving unit 200C may not provide a plurality of touch driving signals TX1, TX2, TX3, and TX4 (see FIG. 9) to the plurality of first sensing electrodes TE1 in the first section W1.

In various embodiments, in the second mode MD2, the display refresh rate of the display layer 100 may be the same as the touch report rate of the sensor layer 200. For example, the display refresh rate of the display layer 100 may be about 120 Hz, and the touch report rate of the sensor layer 200 may be about 120 Hz.

In various embodiments, the touch driving unit 200C may apply less touch driving signals TX1, TX2, TX3, and TX4 (see FIG. 9) to the plurality of first sensing electrodes TE1 in the second mode MD2 than in the first mode MD1. In various embodiments, in an environment in which the noise value NS is relatively high, the touch driving unit 200C may provide a plurality of touch driving signals TX1, TX2, TX3, and TX4 (see FIG. 9) to the plurality of first sensing electrodes TE1 only in the second section W2 in which the data voltage Vdata is not provided to the display layer 100.

In various embodiments, in response to the noise value NS being less than a predetermined noise level, the touch driving unit 200C may operate in the first mode MD1. The first mode MD1 may operate in the first driving mode DMD1 during the first sensing frame SFR1 and operate in the second driving mode DMD2 during the second sensing frame SFR2. In various embodiments, in the data input section AT in which the data voltage Vdata is provided to the display layer 100, the touch driving unit 200C may operate in the first driving mode DMD1, and in the blank section VB in which the data voltage Vdata is not provided to the display layer 100, the touch driving unit 200C may operate in the second driving mode DMD2. The touch driving unit 200C may operate in the first driving mode DMD1 and the second driving mode DMD2 during one display frame FR. The touch report rate of the sensor layer 200 may be improved. Accordingly, the electronic device 1000 having improved sensing reliability may be provided.

In various embodiments, in response to the noise value NS being greater than or equal to the predetermined noise level, the touch driving unit 200C may operate in the second mode MD2. The second mode MD2 may not operate during the first sensing frame SFR1 and may operate in the second driving mode DMD2 during the second sensing frame SFR2. In various embodiments, in the data input section AT in which a noise generated in the display layer 100 is relatively high, the touch driving unit 200C may not operate, and in the blank section VB in which a noise generated in the display layer 100 is relatively low, the touch driving unit 200C may operate in the second driving mode DMD2. In the second section W2 in which the data voltage Vdata is not provided to the display layer 100, by providing a touch driving signal to the plurality of first sensing electrodes TE1, a signal of the display layer 100 and the touch driving signal may not overlap each other. Sensitivity may be improved by increasing a signal-to-noise ratio (SNR) of the sensor layer 200 and the touch driving unit 200C. Accordingly, the electronic device 1000 having improved sensing reliability may be provided.

In various embodiments, the touch driving unit 200C may operate in the first mode MD1 or in the second mode MD2 according to a noise value NS. The touch driving unit 200C may operate in the first mode MD1 in response to the noise value NS being less than a predetermined noise level and operate in the second mode MD2 in response to the noise value NS being greater than or equal to a predetermined noise level. When the touch driving unit 200C is operated in a different mode according to a situation, a noise which may be generated in the sensor layer 200 may be reduced. Sensitivity may be improved by increasing a signal-to-noise ratio (SNR) of the sensor layer 200 and the touch driving unit 200C. Accordingly, the electronic device 1000 having improved sensing reliability may be provided.

Figure 9:
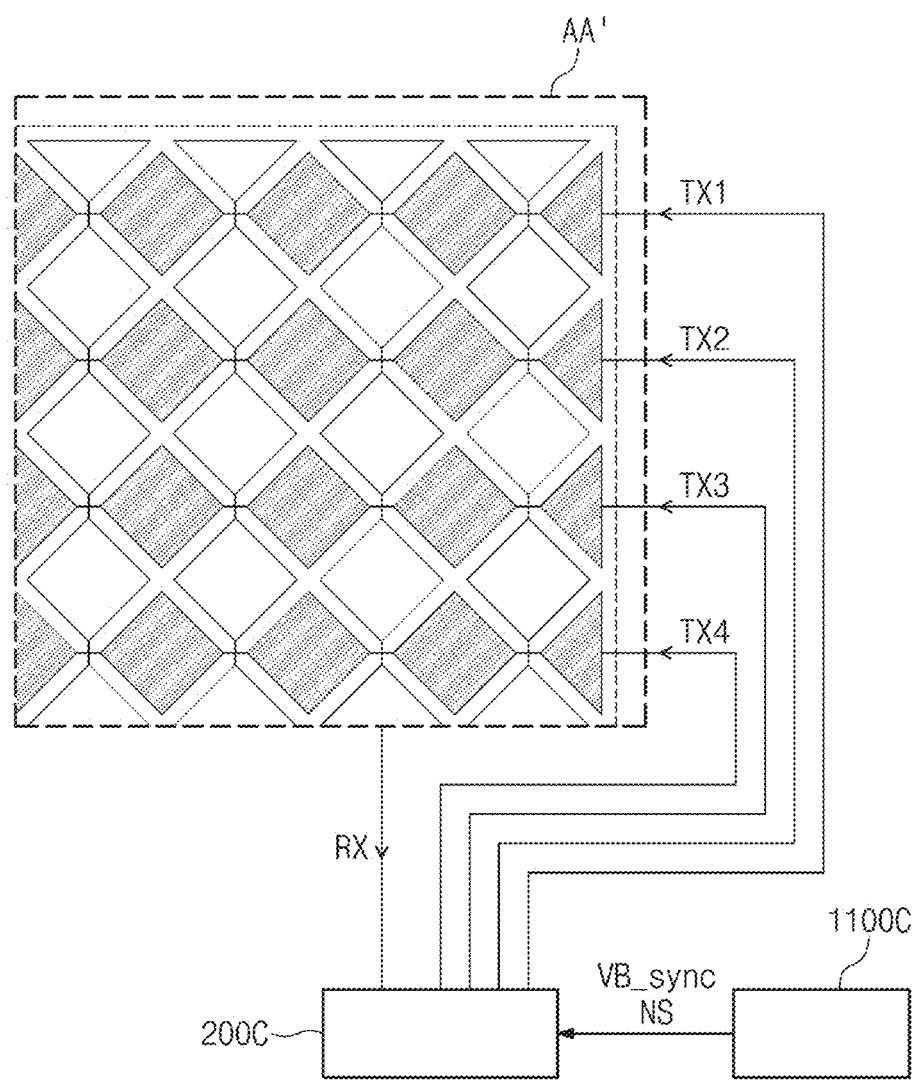
FIG. 9 is a partially enlarged view of a region AA' of FIG. 5 according to an embodiment of the inventive concept.

FIG. 9 is a partially enlarged view of a region AA' of FIG. 5 according to an embodiment. In the description of FIG. 9, the same reference numerals are used for the components described in FIG. 5, and the descriptions thereof may be omitted.

Referring to FIGS. 5 and 9, the touch driving unit 200C may transmit the plurality of touch driving signals TX1, TX2, TX3, and TX4 to the plurality of first sensing electrodes TE1, respectively.

When the plurality of sensing electrodes SP are sensing electrodes of mutual capacitance type, the plurality of second sensing electrodes TE2 may output touch sensing signals RX respectively corresponding to the plurality of touch driving signals TX1, TX2, TX3, and TX4 respectively input to the plurality of first sensing electrodes TE1. FIG. 9 illustrates one touch sensing signal RX, but the embodiment of the inventive concept is not limited thereto. For example, two or more touch sensing signals RX may be output.

In various embodiments, the touch driving unit 200C may calculate the coordinate information of an external input, based on the touch sensing signal RX, and provide the controller 1000C (see FIG. 2) with a coordinate signal I-SS including the coordinate information.

In various embodiments, the touch driving unit 200C may receive a sync signal VB_sync and a noise value NS from the driving unit 1100C.

Based on the sync signal VB_sync, the touch driving unit 200C may control the plurality of sensing electrodes SP in the first driving mode DMD1 (see FIG. 8) or in the second driving mode DMD2 (see FIG. 8). The touch driving unit 200C may receive the noise value NS, and, based on the received noise value NS, the touch driving unit 200C may operate in the first mode MD1 (see FIG. 8) or in the second mode MD2 (see FIG. 8).

Figure 10:
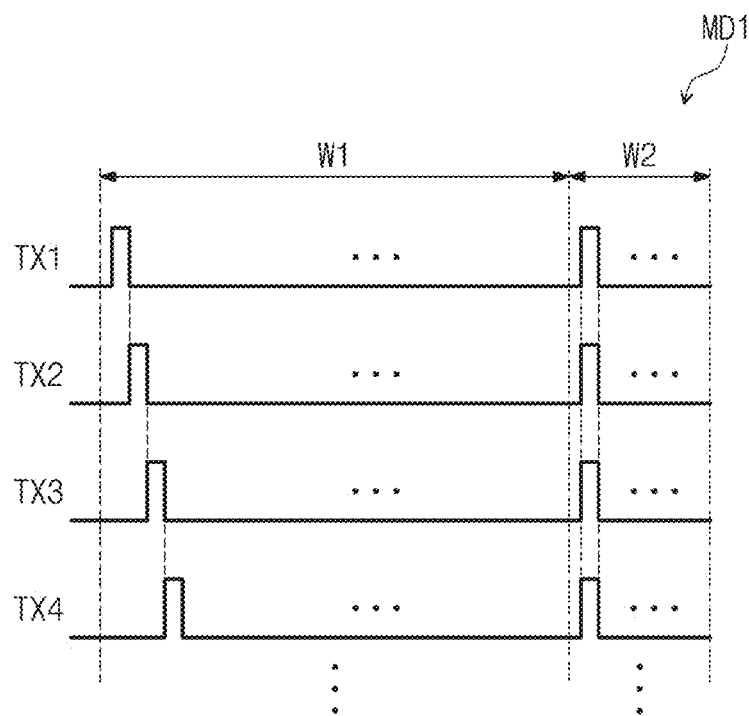
FIG. 10 is a waveform diagram of touch driving signals in a first mode according to an embodiment of the inventive concept.
Figure 11:
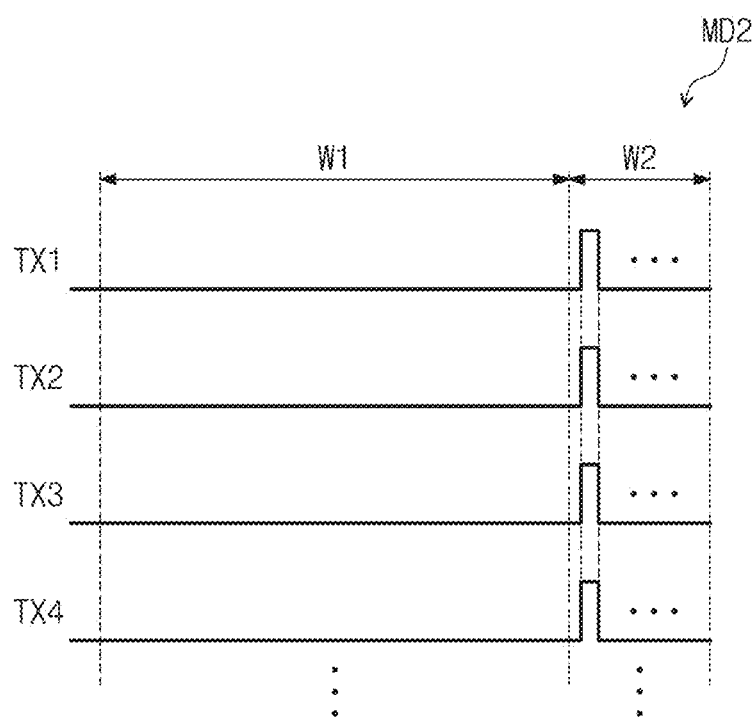
FIG. 11 is a waveform diagram of touch driving signals in a second mode according to an embodiment of the inventive concept.

FIG. 10 is a waveform diagram of touch driving signals in a first mode according to an embodiment of the inventive concept. FIG. 11 is a waveform diagram of touch driving signals in a second mode according to an embodiment of the inventive concept.

Referring to FIGS. 8, 9, and 10, the driving unit 1100C may transmit a noise value NS less than a predetermined noise level to the touch driving unit 200C, where the touch driving unit 200C may operate in the first mode MD1.

When operating in the first mode MD1, the touch driving unit 200C may operate in the first driving mode DMD1 in the first sensing frame SFR1.

In the first driving mode DMD1, the touch driving unit 200C may transmit a first touch driving signal TX1 to one (1-1)-th sensing electrode among the plurality of first sensing electrodes TE1.

After transmitting the first touch driving signal TX1, the touch driving unit 200C may transmit a second touch driving signal TX2 to a (1-2)-th sensing electrode adjacent to the (1-1)-th sensing electrode among the plurality of first sensing electrodes TE1.

After transmitting the second touch driving signal TX2, the touch driving unit 200C may transmit a third touch driving signal TX3 to a (1-3)-th sensing electrode adjacent to the (1-2)-th sensing electrode among the plurality of first sensing electrodes TE1.

After transmitting the third touch driving signal TX3, the touch driving unit 200C may transmit a fourth touch driving signal TX4 to a (1-4)-th sensing electrode adjacent to the (1-3)-th sensing electrode among the plurality of first sensing electrodes TE1.

In various embodiments, in the first driving mode DMD1, the touch driving unit 200C may sequentially transmit the first touch driving signal TX1, the second touch driving signal TX2, the third touch driving signal TX3, and the fourth touch driving signal TX4 to the plurality of first sensing electrodes TE1, respectively.

When the touch driving signals are simultaneously provided to the plurality of first sensing electrodes TE1 in the data input section AT, a noise may be generated in the display layer 100 due to the touch driving signals, resulting in image quality deterioration, for example, a flicker phenomenon. However, the touch driving unit 200C may sequentially transmit the plurality of touch driving signals TX1, TX2, TX3, and TX4 to the plurality of sensing electrodes in the data input section AT, respectively, where the number of signals simultaneously provided may be reduced. In the sensor layer 200 configured to operate in the first driving mode DMD1, the amount of signals simultaneously provided may be reduced, such that interference between the display layer 100 and the sensor layer 200 may be reduced. Accordingly, image quality deterioration may be reduced, thereby making it possible to obtain an electronic device with improved display quality.

In response to the sync signal VB_sync being activated while the touch driving unit 200C operates in the first mode MD1, the touch driving unit 200C may operate in the second driving mode DMD2 in the second sensing frame SFR2.

In the second driving mode DMD2, the touch driving unit 200C may simultaneously transmit the plurality of touch driving signals TX1, TX2, TX3, and TX4 to the plurality of first sensing electrodes TE1, respectively.

When the noise value NS is less than a predetermined noise level, the touch driving unit 200C may operate in the first mode MD1. The first mode MD1 may operate in the first driving mode DMD1 during the first sensing frame SFR1 and operate in the second driving mode DMD2 during the second sensing frame SFR2. In the data input section AT in which the data voltage Vdata is provided to the display layer 100, the touch driving unit 200C may operate in the first driving mode DMD1 in order to prevent image quality deterioration, and in the blank section VB in which the data voltage Vdata is not provided to the display layer 100, the touch driving unit 200C may operate in the second driving mode DMD2 in order to secure a signal-to-noise ratio. In the first mode MD1, the touch driving unit 200C may operate in the first driving mode DMD1 and the second driving mode DMD2 during one display frame FR. The touch report rate of the sensor layer 200 may be improved. Accordingly, the electronic device 1000 having improved sensing reliability may be provided.

Referring to FIGS. 8, 9, and 11, the driving unit 1100C may transmit a noise value NS greater than or equal to a predetermined noise level to the touch driving unit 200C. In this case, the touch driving unit 200C may operate in the second mode MD2.

When operating in the second mode MD2, the touch driving unit 200C may not transmit the plurality of touch driving signals TX1, TX2, TX3, and TX4 to the plurality of first sensing electrodes TE1 in the first sensing frame SFR1 of the first section W1.

In response to the sync signal VB_sync being activated while the touch driving unit 200C operates in the second mode MD2, the touch driving unit 200C may operate in the second driving mode DMD2 in the second sensing frame SFR2 of the second section W2.

In the second driving mode DMD2, the touch driving unit 200C may simultaneously transmit the plurality of touch driving signals TX1, TX2, TX3, and TX4 to the plurality of first sensing electrodes TE1, respectively.

When the noise value NS is greater than or equal to the predetermined noise level, the touch driving unit 200C may operate in the second mode MD2. The second mode MD2 may not operate during the first sensing frame SFR1 and may operate in the second driving mode DMD2 during the second sensing frame SFR2. In the data input section AT in which a noise generated in the display layer 100 is relatively high, the touch driving unit 200C may not operate, and in the blank section VB in which a noise generated in the display layer 100 is relatively low, the touch driving unit 200C may operate in the second driving mode DMD2. In the second section W2 in which the data voltage Vdata is not provided to the display layer 100, the signal of the display layer 100 and the plurality of touch driving signals TX1, TX2, TX3, and TX4 may not overlap each other during the same time by providing the plurality of touch driving signals TX1, TX2, TX, and TX4 to the plurality of first sensing electrodes TE1. Sensitivity may be improved by increasing a signal-to-noise ratio (SNR) of the sensor layer 200 and the touch driving unit 200C. Accordingly, an electronic device 1000 having improved sensing reliability may be provided.

In various embodiments, the second mode MD2 may not operate during the first sensing frame SFR1 and operate in the second driving mode DMD2 during the second sensing frame SFR2. The driving time of the touch driving unit 200C may be shortened. Accordingly, the electronic device 1000 with reduced power consumption may be provided.

In various embodiments, the touch driving unit 200C may apply more touch driving signals TX1, TX2, TX3, and TX4 to the plurality of first sensing electrodes TE1 in the first mode MD1 than in the second mode MD2.

Figure 12:
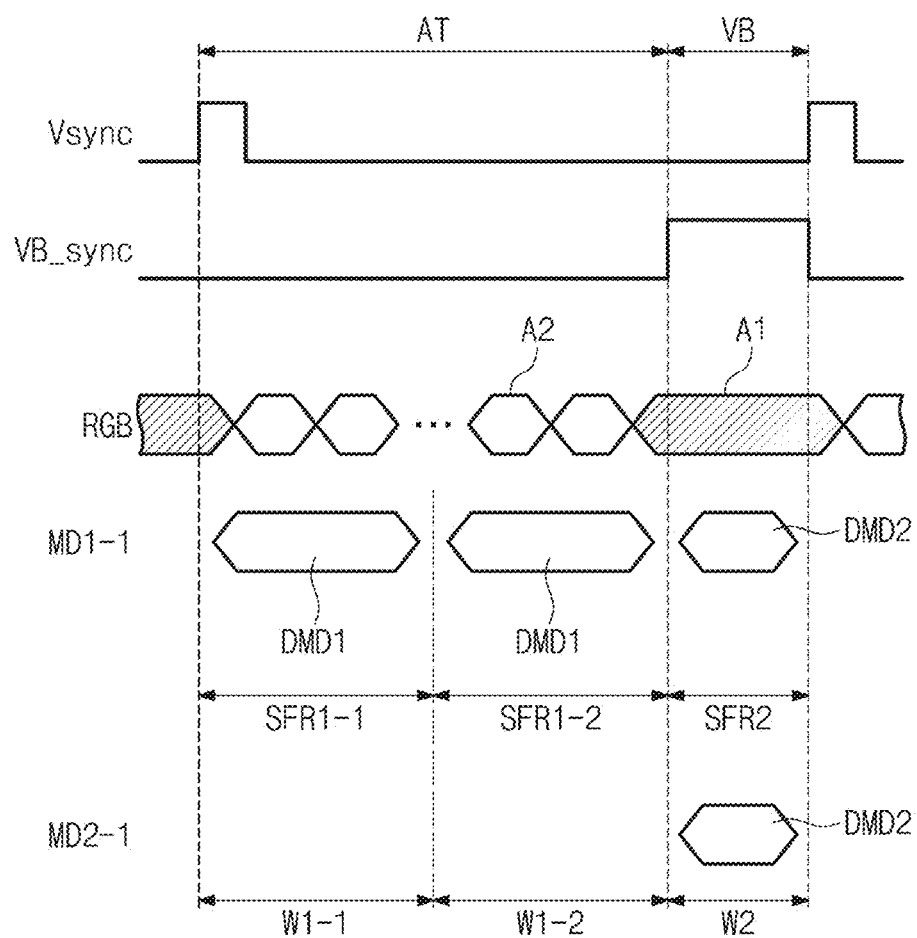
FIG. 12 is a waveform diagram of signals applied by the touch driving unit and the driving unit according to an embodiment of the inventive concept.

FIG. 12 is a waveform diagram of signals applied by the touch driving unit and the driving unit according to an embodiment of the inventive concept. In the description of FIG. 12, the same reference numerals are used for the components described in FIG. 8, and the descriptions thereof may be omitted.

Referring to FIGS. 2, 4, 5, and 12, the driving unit 1100C may sense a noise value NS to be applied to the sensor layer 200, based on an input image RGB of a next display frame FR. For example, the noise value NS according to the input image RGB may be stored in the memory of the driving unit 1100C in the form of a lookup table. The driving unit 1100C may transmit the sensed noise value NS to the touch driving unit 200C. The touch driving unit 200C may operate in a (1-1)-th mode MD1-1 or a (2-1)-th mode MD2-1, based on the noise value NS.

In various embodiments, the touch driving unit 200C may sense the sensor layer 200 in units of sensing frames SFR1-1, SFR1-2, and SFR2. The touch report rate of the sensor layer 200 may have the second frequency. The first frequency may be lower than or equal to the second frequency. For example, the touch report rate may be about 360 Hz or about 120 Hz. However, this is an example, and the touch report rate according to an embodiment of the inventive concept is not limited thereto. For example, the touch report rate may be equal to the display refresh rate or three times the display refresh rate.

In various embodiments, the sensing frames SFR1-1, SFR1-2, and SFR2 may include a (1-1)-th sensing frame SFR1-1, a (1-2)-th sensing frame SFR1-2, and a second sensing frame SFR2. A (1-1)-th section W1-1 of the (1-1)-th sensing frame SFR1-1 and a (1-2)-th section W1-2 of the second sensing frame SFR2 may overlap the data input section AT, and the second section W2 of the third sensing frame SFR3 may overlap the blank section VB. For example, the (1-1)-th sensing frame SFR1-1 may overlap a portion of the data input section AT, and the (1-2)-th sensing frame SFR1-2 may overlap the remaining portion of the data input section AT. The (1-1)-th sensing frame SFR1-1 may be referred to as a first sensing frame, and the (1-2)-th sensing frame SFR1-2 may be referred to as a third sensing frame.

In various embodiments, the touch driving unit 200C may operate in the (1-1)-th mode MD1-1 or the (2-1)-th mode MD2-1, based on a noise value NS. The touch driving unit 200C may operate in the (1-1)-th mode MD1-1 when the noise value NS is less than a predetermined noise level and operate in the (2-1)-th mode MD2-1 when the noise value NS is greater than or equal to a predetermined noise level.

In the (1-1)-th mode MD1-1, the touch driving unit 200C may operate in a plurality of first driving modes DMD1 in the (1-1)-th section W1-1. In the (1-1)-th section W1-1 of the (1-1)-th sensing frame SFR1-1 and the (1-2)-th section W1-2 of the second sensing frame SFR2, the touch driving unit 200C may operate in the first driving mode DMD1.

In the (1-1)-th mode MD1-1, the touch driving unit 200C may operate in the second driving mode DMD2 in the second section W2. In the second sensing frame SFR2 of the second section W2, the touch driving unit 200C may operate in the second driving mode DMD2.

In the (1-1)-th mode MD1-1, the display refresh rate of the display layer 100 may be lower than the touch report rate of the sensor layer 200. For example, the display refresh rate of the display layer 100 may be about 120 Hz, and the touch report rate of the sensor layer 200 may be about 360 Hz.

In the (2-1)-th mode MD2-1, the touch driving unit 200C may operate in the second driving mode DMD2 only in the second section W2. In this case, the touch driving unit 200C may not provide the plurality of touch driving signals TX1, TX2, TX3, and TX4 (see FIG. 9) to the plurality of first sensing electrodes TE1 in the first section W1.

In the (2-1)-th mode MD2-1, the display refresh rate of the display layer 100 may be the same as the touch report rate of the sensor layer 200. For example, the display refresh rate of the display layer 100 may be about 120 Hz, and the touch report rate of the sensor layer 200 may be about 120 Hz.

In various embodiments, the touch driving unit 200C may apply less touch driving signals TX1, TX2, TX3, and TX4 (see FIG. 9) to the plurality of first sensing electrodes TE1 in the (2-1)-th mode MD2-1 than in the (1-1)-th mode MD1-1. In an environment in which a noise value NS is relatively high, the touch driving unit 200C may provide the plurality of touch driving signals TX1, TX2, TX3, and TX4 (see FIG. 9) to the plurality of first sensing electrodes TE1 only in the second section W2 in which the data voltage Vdata is not provided to the display layer 100.

In various embodiments, in response to the noise value NS being less than a predetermined noise level, the touch driving unit 200C may operate in the (1-1)-th mode MD1-1. The (1-1)-th mode MD1-1 may operate in the first driving mode DMD1 during each of the (1-1)-th sensing frame SFR1-1 and the (2-1)-th sensing frame SFR2-1 and operate in the second driving mode DMD2 during the second sensing frame SFR2. In the data input section AT in which the data voltage Vdata is provided to the display layer 100, the touch driving unit 200C may operate in the plurality of first driving modes DMD1, and in the blank section VB in which the voltage Vdata is not provided, the touch driving unit 200C may operate in the second driving mode DMD2. The touch driving unit 200C may operate in the plurality of first driving modes DMD1 and the second driving mode DMD2 during one display frame FR. The touch report rate of the sensor layer 200 may be improved. Accordingly, an electronic device 1000 having improved sensing reliability may be provided.

In various embodiments, the touch driving unit 200C may operate in the (1-1)-th mode MD1-1 or the (2-1)-th mode MD2-1 according to a noise value NS. The touch driving unit 200C may operate in the (1-1)-th mode MD1-1 when the noise value NS is less than a predetermined noise level and operate in the (2-1)-th mode MD2-1 when the noise value NS is greater than or equal to a predetermined noise level. When the touch driving unit is operated in a different mode according to a situation, a noise which may be generated in the sensor layer 200 may be reduced. Sensitivity may be improved by increasing a signal-to-noise ratio (SNR) of the sensor layer 200 and the touch driving unit 200C. Accordingly, the electronic device 1000 having improved sensing reliability may be provided.

In various embodiments, the electronic device may operate in the first mode or the second mode according to a noise value. As a noise, which may be generated in the sensor layer, may be reduced when the touch driving unit is operated in a different mode according to a situation, the signal-to-noise ratio (SNR) of the sensor layer and the touch driving unit may be increased. Accordingly, it is possible to provide the electronic device with improved sensing reliability.

Although the above has been described with reference to various embodiments of the inventive concept, those skilled in the art or those of ordinary skill in the art will understand that various modifications and changes can be made within the scope of the spirit and technical field of the inventive concept in the disclosure and recited in the claims. Accordingly, the technical scope of the inventive concept should not be limited to the content described in the detailed description of the specification, but should be determined by the claims.

What is claimed is:

1. An electronic device comprising:
a display layer configured to operate in units of a display frame comprising a blank section and a data input section;
a driving unit configured to drive the display layer, output a sync signal which is activated in the blank section, and sense a noise value, based on an input image to be provided during the display frame;
a sensor layer comprising a plurality of sensing electrodes and configured to operate in a first sensing frame overlapping the data input section and in a second sensing frame overlapping the blank section; and
a touch driving unit configured to operate in a first mode in response to the noise value being less than a predetermined noise level and configured to operate in a second mode different from the first mode in response to the noise value being greater than or equal to the predetermined noise level,
wherein the touch driving unit applies more touch driving signals to the plurality of sensing electrodes in the first mode than in the second mode.

2. The electronic device of claim 1, wherein, in the first mode, the touch driving unit operates in a first driving mode in the first sensing frame and operates in a second driving mode different from the first driving mode in the second sensing frame.

3. The electronic device of claim 2, wherein operating in the first driving mode, the touch driving unit is configured to sequentially apply the touch driving signals to the plurality of sensing electrodes, respectively.

4. The electronic device of claim 2, wherein, in the second driving mode, the touch driving unit is configured to simultaneously apply the touch driving signals to the plurality of sensing electrodes, respectively.

5. The electronic device of claim 2, wherein, in the second mode, the touch driving unit operates in the second driving mode in the second sensing frame.

6. The electronic device of claim 5, wherein, in the second mode, the touch driving unit does not provide the touch driving signals to the plurality of sensing electrodes in the first sensing frame.

7. The electronic device of claim 1, wherein:
the plurality of sensing electrodes comprise a plurality of first electrodes and a plurality of second electrodes, wherein:
  each of the plurality of first electrodes extends in a first direction and is arranged in a second direction crossing the first direction; and
  each of the plurality of second electrodes extends in the second direction and is arranged in the first direction.

8. The electronic device of claim 1, wherein:
a display refresh rate of the display layer has a first frequency; and
a touch report rate of the sensor layer has a second frequency,
wherein:
  the first frequency in the first mode is lower than the second frequency; and
  the first frequency in the second mode is the same as the second frequency.

9. The electronic device of claim 1, wherein:
the touch driving unit is configured to receive the sync signal from the driving unit; and
in response to the sync signal being activated, the touch driving unit simultaneously applies the touch driving signals to the plurality of sensing electrodes.

10. The electronic device of claim 1, wherein a width of the blank section is smaller than a width of the data input section.

11. The electronic device of claim 1, wherein a width of the second sensing frame is smaller than a width of the first sensing frame.

12. An electronic device comprising:
a display layer configured to operate in units of a display frame comprising a blank section and a data input section;
a driving unit configured to drive the display layer, output a sync signal which is activated in the blank section, and sense a noise value, based on an input image to be provided during the display frame,
wherein the driving unit comprises a data driving unit and a gate driving unit,
wherein:
  the data driving unit is configured to supply a data voltage converted based on the input image to data lines of the display layer during the data input section; and
  the gate driving unit supplies a gate pulse synchronized with the data voltage to gate lines of the display layer during the data input section;
a sensor layer comprising a plurality of sensing electrodes and configured to operate in a first sensing frame overlapping the data input section and in a second sensing frame overlapping the blank section; and
a touch driving unit configured to operate in a first mode in response to the noise value being less than a predetermined noise level and configured to operate in a second mode different from the first mode in response to the noise value being greater than or equal to the predetermined noise level,
wherein the touch driving unit applies more touch driving signals to the plurality of sensing electrodes in the first mode than in the second mode.

13. The electronic device of claim 12, wherein the blank section is a section in which the data voltage is not provided to the display layer.

14. The electronic device of claim 12, wherein:
the sensor layer further is configured to operate in a third sensing frame overlapping the data input section; and
the touch driving unit is configured to operate in the first driving mode in the third sensing frame in the first mode.

15. An electronic device comprising:
a display layer configured to operate in units of a display frame comprising a blank section and a data input section;
a driving unit configured to drive the display layer and sense a noise value, based on an input image to be provided to during the display frame; and
a sensor layer comprising a plurality of sensing electrodes and configured to operate in units of a sensing frame comprising a first sensing frame overlapping the data input section and a second sensing frame overlapping the blank section,
wherein the plurality of sensing electrodes operate in a first mode or in a second mode different from the first mode, based on the noise value,
wherein:
  in the first mode, each of the plurality of sensing electrodes sequentially receives a touch driving signal in the first sensing frame and the plurality of sensing electrodes simultaneously receive the touch driving signal in the second sensing frame; and
  in the second mode, the plurality of sensing electrodes simultaneously receive the touch driving signals only in the second sensing frame.

16. The electronic device of claim 15, wherein, in the second mode, the plurality of sensing electrodes do not receive the touch driving signals in the first sensing frame.

17. The electronic device of claim 15, wherein:
the driving unit is configured to output a sync signal which is activated in the blank section; and
in response to the sync signal being activated, the plurality of sensing electrodes simultaneously receive the touch driving signals.

18. The electronic device of claim 15, wherein:
a display refresh rate of the display layer has a first frequency; and
a touch report rate of the sensor layer has a second frequency,
wherein:
  the first frequency in the first mode is lower than the second frequency; and
  the first frequency in the second mode is the same as the second frequency.

19. The electronic device of claim 15, wherein a width of the blank section is smaller than a width of the data input section.

20. The electronic device of claim 15, wherein a width of the second sensing frame is smaller than a width of the first sensing frame.

* * * * *